US010666585B2

(12) United States Patent
Griffin

(10) Patent No.: US 10,666,585 B2
(45) Date of Patent: *May 26, 2020

(54) METHOD, DEVICES, AND SYSTEM FOR DETERMINING THE PRESENCE STATUS OF A MESSAGE RECIPIENT AND DISPLAYING THE NAME AND PRESENCE INDICATION OF ENTRIES IN AN ADDRESS BOOK MATCHING PARTIAL INPUT BASED ON THE LOCATION OF A MOBILE COMMUNICATION DEVICE

(71) Applicant: BlackBerry Limited, Waterloo (CA)

(72) Inventor: Jason Tyler Griffin, Kitchener (CA)

(73) Assignee: BlackBerry Limited, Waterloo, Ontario (CA)

(*) Notice: Subject to any disclaimer, the term of this patent is extended or adjusted under 35 U.S.C. 154(b) by 461 days.

This patent is subject to a terminal disclaimer.

(21) Appl. No.: 14/864,180

(22) Filed: Sep. 24, 2015

(65) Prior Publication Data

US 2016/0014056 A1 Jan. 14, 2016

Related U.S. Application Data

(63) Continuation of application No. 13/177,791, filed on Jul. 7, 2011, now Pat. No. 9,680,777, which is a
(Continued)

(51) Int. Cl.
*H04L 12/58* (2006.01)
*G06Q 10/10* (2012.01)

(52) U.S. Cl.
CPC ......... *H04L 51/043* (2013.01); *G06Q 10/107* (2013.01); *H04L 51/22* (2013.01)

(58) Field of Classification Search
CPC ....... H04L 51/043; H04L 51/22; H04L 67/24; G06Q 10/107
(Continued)

(56) References Cited

U.S. PATENT DOCUMENTS 5,493,692 A 2/1996 Theimer et al.
5,859,623 A * 1/1999 Meyn ........................ G06F 3/14
345/698
(Continued)

FOREIGN PATENT DOCUMENTS

CN 1756129 A 4/2006
CN 1843008 A 10/2006
(Continued)

OTHER PUBLICATIONS

Truta, Filip; "iSoftPhone 2.3 Adds Address Book Integration—SMS and IM Chat"; Softpedia; http://news.softpedia.com/news/iSoftPhone-2-3-Adds-Address-Book-Integration-SMS-and-IM-Chat-90178.shtml; Jul. 17, 2008; 2 pages.
(Continued)

*Primary Examiner* — Daniel C. Murray
(74) *Attorney, Agent, or Firm* — Conley Rose, P.C.; J. Robert Brown, Jr.; Gayatry S. Nair

(57) ABSTRACT

A communication device receives an out-of-office message regarding a first contact. An application executing on the communication device displays a name of the first contact and an out-of-office indication regarding the first contact without displaying said out-of-office message.

30 Claims, 7 Drawing Sheets

Related U.S. Application Data continuation of application No. 12/484,494, filed on Jun. 15, 2009, now Pat. No. 7,984,105.

(58) Field of Classification Search
USPC .......................................................... 709/206
See application file for complete search history.

(56) References Cited

U.S. PATENT DOCUMENTS

| | | | | |
|---|---|---|---|---|
| 6,144,989 | A * | 11/2000 | Hodjat | G06N 5/043 709/202 |
| 6,247,043 | B1 * | 6/2001 | Bates | G06F 17/30699 707/E17.059 |
| 6,430,604 | B1 * | 8/2002 | Ogle | H04L 51/04 709/203 |
| 6,654,790 | B2 * | 11/2003 | Ogle | H04L 51/04 709/203 |
| 6,714,974 | B1 * | 3/2004 | Machida | H04L 41/22 709/204 |
| 7,386,595 | B1 | 6/2008 | Bloomer, Jr. et al. | |
| 7,433,920 | B2 * | 10/2008 | Blagsvedt | G06Q 10/10 709/204 |
| 7,603,417 | B2 | 10/2009 | Ben-Yoseph | |
| 7,634,463 | B1 * | 12/2009 | Katragadda | G06Q 10/10 701/431 |
| 7,730,134 | B2 * | 6/2010 | Blagsvedt | G06Q 10/10 709/204 |
| 7,742,432 | B2 * | 6/2010 | Dominick | H04L 41/22 370/254 |
| 7,984,105 | B2 | 7/2011 | Griffin | |
| 8,069,166 | B2 * | 11/2011 | Alvarado | G06Q 10/109 707/722 |
| 8,136,125 | B2 * | 3/2012 | Beadle | H04L 67/24 709/207 |
| 8,204,937 | B2 * | 6/2012 | Blagsvedt | G06Q 10/10 709/204 |
| 8,332,253 | B1 * | 12/2012 | Farmer | G06Q 10/0633 705/7.27 |
| 8,332,475 | B2 * | 12/2012 | Rosen | H04L 51/36 709/200 |
| 8,539,029 | B2 | 9/2013 | Manning et al. | |
| 8,583,737 | B2 * | 11/2013 | Blagsvedt | G06Q 10/10 709/204 |
| 8,726,165 | B1 * | 5/2014 | Phillips | G06F 3/0237 715/739 |
| 8,874,677 | B2 * | 10/2014 | Rosen | H04L 51/36 709/206 |
| 8,929,921 | B2 * | 1/2015 | Gum | G01S 19/14 348/207.1 |
| 9,049,574 | B2 * | 6/2015 | Rosen | H04L 51/36 |
| 9,055,416 | B2 * | 6/2015 | Rosen | H04L 51/36 |
| 9,100,806 | B2 * | 8/2015 | Rosen | H04L 51/36 |
| 9,100,807 | B2 * | 8/2015 | Rosen | H04L 51/36 |
| 9,451,038 | B2 * | 9/2016 | Beadle | H04L 67/24 |
| 9,491,134 | B2 * | 11/2016 | Rosen | H04L 51/36 |
| 9,521,107 | B2 * | 12/2016 | Rosen | H04L 51/36 |
| 9,577,968 | B2 * | 2/2017 | Rosen | H04L 51/36 |
| 9,577,977 | B2 * | 2/2017 | Rosen | H04L 51/36 |
| 9,614,809 | B2 * | 4/2017 | Rosen | H04L 51/06 |
| 9,628,432 | B2 * | 4/2017 | Rosen | H04L 51/06 |
| 9,660,945 | B2 * | 5/2017 | Rosen | H04L 51/06 |
| 10,250,713 | B2 * | 4/2019 | Beadle | H04L 67/24 |
| 2001/0002469 | A1 * | 5/2001 | Bates | G06F 17/30699 |
| 2002/0022983 | A1 * | 2/2002 | Barton | G06Q 10/08 705/336 |
| 2002/0072356 | A1 | 6/2002 | Yamashita et al. | |
| 2002/0090069 | A1 | 7/2002 | Yaker | |
| 2002/0097856 | A1 * | 7/2002 | Wullert, II | H04L 51/04 379/201.01 |
| 2003/0046296 | A1 * | 3/2003 | Doss | G06Q 10/109 |
| 2003/0063313 | A1 * | 4/2003 | Ito | G06F 3/1253 358/1.15 |
| 2003/0093474 | A1 * | 5/2003 | Kakuta | G11B 20/10 709/204 |
| 2003/0177205 | A1 * | 9/2003 | Liang | H04L 41/22 709/220 |
| 2004/0141594 | A1 * | 7/2004 | Brunson | H04L 29/06027 379/88.12 |
| 2004/0267595 | A1 * | 12/2004 | Woodings | G06Q 10/06 705/7.14 |
| 2005/0021636 | A1 | 1/2005 | Kumar | |
| 2005/0033662 | A1 * | 2/2005 | Buch | G06Q 30/02 705/27.2 |
| 2005/0038876 | A1 * | 2/2005 | Chaudhuri | G06F 17/3087 709/219 |
| 2005/0050547 | A1 * | 3/2005 | Whittle | G06F 17/30286 719/310 |
| 2005/0091314 | A1 * | 4/2005 | Blagsvedt | G06Q 10/10 709/204 |
| 2005/0125744 | A1 * | 6/2005 | Hubbard | G06F 3/0482 715/824 |
| 2005/0266835 | A1 * | 12/2005 | Agrawal | G06Q 10/10 455/414.3 |
| 2006/0075038 | A1 | 4/2006 | Mason et al. | |
| 2006/0079210 | A1 | 4/2006 | Fujibayashi | |
| 2006/0079968 | A1 * | 4/2006 | Takemura | H04H 60/04 700/48 |
| 2006/0236089 | A1 * | 10/2006 | Cohen | G06F 17/30575 713/150 |
| 2006/0259586 | A1 * | 11/2006 | Wood | G06F 16/954 709/219 |
| 2007/0022161 | A1 | 1/2007 | Klug et al. | |
| 2007/0027921 | A1 * | 2/2007 | Alvarado | G06Q 10/109 |
| 2007/0115991 | A1 * | 5/2007 | Ramani | G06F 17/276 370/392 |
| 2007/0192419 | A1 | 8/2007 | Vuong et al. | |
| 2007/0198696 | A1 * | 8/2007 | Morris | G06Q 10/00 709/224 |
| 2007/0198725 | A1 * | 8/2007 | Morris | G06Q 10/10 709/227 |
| 2007/0238472 | A1 * | 10/2007 | Wanless | H04L 29/06027 455/461 |
| 2007/0288580 | A1 | 12/2007 | Kaminsky et al. | |
| 2008/0040441 | A1 | 2/2008 | Maes | |
| 2008/0059568 | A1 | 3/2008 | Takagi | |
| 2008/0104177 | A1 * | 5/2008 | Keohane | G06Q 10/107 709/206 |
| 2008/0133580 | A1 * | 6/2008 | Wanless | H04L 29/12122 |
| 2008/0212762 | A1 * | 9/2008 | Gray | H04M 3/42374 379/211.01 |
| 2009/0030998 | A1 * | 1/2009 | Blagsvedt | G06Q 10/10 709/206 |
| 2009/0037139 | A1 * | 2/2009 | Rust | G01B 11/024 702/158 |
| 2009/0077183 | A1 | 3/2009 | Bruce et al. | |
| 2009/0088144 | A1 * | 4/2009 | Beadle | H04L 67/24 455/419 |
| 2009/0089308 | A1 * | 4/2009 | Beadle | G06F 16/27 |
| 2009/0089804 | A1 * | 4/2009 | Beadle | H04L 67/24 719/318 |
| 2009/0138110 | A1 * | 5/2009 | Kohyama | H04R 29/007 700/94 |
| 2009/0172105 | A1 | 7/2009 | Cruz et al. | |
| 2009/0198783 | A1 | 8/2009 | Bloomer, Jr. et al. | |
| 2009/0325609 | A1 * | 12/2009 | Rosen | H04L 51/36 455/466 |
| 2010/0153881 | A1 * | 6/2010 | Dinn | G06F 17/30572 715/825 |
| 2010/0182439 | A1 * | 7/2010 | Morita | H04N 5/765 348/207.11 |
| 2010/0211515 | A1 * | 8/2010 | Woodings | G06Q 10/06 705/320 |
| 2010/0235761 | A1 * | 9/2010 | Blagsvedt | G06Q 10/10 715/752 |
| 2010/0262660 | A1 * | 10/2010 | Little | H04L 67/24 709/206 |
| 2010/0268810 | A1 * | 10/2010 | Sato | G08C 23/04 709/223 |

(56) References Cited

U.S. PATENT DOCUMENTS

| | | | |
|---|---|---|---|
| 2011/0004503 A1 | 1/2011 | Farrell et al. | |
| 2011/0069356 A1* | 3/2011 | Yoshida | H04N 1/00217 358/442 |
| 2011/0208801 A1* | 8/2011 | Thorkelsson | H04L 67/2814 709/203 |
| 2011/0269439 A1 | 11/2011 | Griffin | |
| 2012/0078924 A1* | 3/2012 | Woodings | G06Q 10/06 707/754 |
| 2012/0086975 A1* | 4/2012 | Ozaki | G06F 3/1219 358/1.15 |
| 2012/0110621 A1* | 5/2012 | Gossweiler, III | G06Q 50/01 725/46 |
| 2012/0150955 A1* | 6/2012 | Tseng | H04L 51/22 709/204 |
| 2012/0254772 A1* | 10/2012 | Blagsvedt | G06Q 10/10 715/752 |
| 2012/0297000 A1 | 11/2012 | DellaFera et al. | |
| 2013/0080553 A1* | 3/2013 | Rosen | H04L 51/36 709/206 |
| 2013/0198669 A1* | 8/2013 | Gao | G06F 3/0482 715/771 |
| 2014/0075325 A1* | 3/2014 | Blagsvedt | G06Q 10/10 715/739 |
| 2014/0156686 A1* | 6/2014 | Woodings | G06Q 10/06 707/756 |
| 2014/0325392 A1* | 10/2014 | Gossweiler, III | G06Q 50/01 715/753 |
| 2014/0378102 A1* | 12/2014 | Rosen | H04L 51/36 455/412.1 |
| 2014/0378174 A1* | 12/2014 | Rosen | H04L 51/36 455/466 |
| 2014/0378175 A1* | 12/2014 | Rosen | H04L 51/36 455/466 |
| 2014/0379794 A1* | 12/2014 | Rosen | H04L 51/36 709/203 |
| 2014/0379830 A1* | 12/2014 | Rosen | H04L 51/36 709/206 |
| 2015/0181050 A1* | 6/2015 | Nishii | H04N 1/00307 358/1.15 |
| 2015/0304256 A1* | 10/2015 | Rosen | H04L 51/36 709/206 |
| 2015/0304725 A1* | 10/2015 | Itagaki | G06F 21/35 725/25 |
| 2016/0036742 A1* | 2/2016 | Rosen | H04L 51/36 455/466 |
| 2016/0036743 A1* | 2/2016 | Rosen | H04L 51/36 709/206 |
| 2016/0036744 A1* | 2/2016 | Rosen | H04L 51/36 709/206 |
| 2016/0036745 A1* | 2/2016 | Rosen | H04L 51/36 709/206 |
| 2016/0036746 A1* | 2/2016 | Rosen | H04L 51/36 455/466 |
| 2016/0269350 A1* | 9/2016 | Rosen | H04L 51/36 |
| 2016/0330154 A1* | 11/2016 | Rosen | H04L 51/36 |
| 2016/0381174 A1* | 12/2016 | Beadle | H04L 67/24 709/205 |
| 2016/0381640 A1* | 12/2016 | Beadle | H04L 67/24 370/311 |
| 2017/0345080 A1* | 11/2017 | Asai | G06Q 10/083 |
| 2018/0126767 A1* | 5/2018 | Kanamoto | B26F 1/0092 |
| 2019/0191007 A1* | 6/2019 | Beadle | H04L 67/24 |

FOREIGN PATENT DOCUMENTS

| | | |
|---|---|---|
| CN | 1998202 A | 7/2007 |
| CN | 101136820 A | 3/2008 |
| WO | 2004088943 A2 | 10/2004 |
| WO | 2005045799 A1 | 5/2005 |
| WO | 2006036258 A1 | 4/2006 |

OTHER PUBLICATIONS

Jabber, Inc.; "Presence Enabled Applications—Outlook Integration"; http://www.jabber.com/CE/outlookintegration; 2007; 2 pages.

Notice of Allowability dated Feb. 24, 2011; U.S. Appl. No. 12/484,494, filed Jun. 15, 2009; 14 pages.

Notice of Allowance dated Mar. 11, 2011; U.S. Appl. No. 12/484,494, filed Jun. 15, 2009; 4 pages.

Office Action dated Jan. 24, 2013; U.S. Appl. No. 13/177,791, filed Jul. 7, 2011; 21 pages.

Office Action dated Aug. 12, 2013; U.S. Appl. No. 13/177,791, filed Jul. 7, 2011; 22 pages.

Final Office Action dated Dec. 27, 2013; U.S. Appl. No. 13/177,791, filed Jul. 7, 2011; 24 pages.

Advisory Action dated Mar. 7, 2014; U.S. Appl. No. 13/177,791, filed Jul. 7, 2011; 9 pages.

European Extended Search Report; Application No. 09162654.9; dated Sep. 22, 2009; 9 pages.

Canadian Office Action; Application No. 2,707,399; dated Jan. 16, 2013; 2 pages.

Canadian Office Action; Application No. 2,707,399; dated Mar. 24, 2014; 2 pages.

Chinese Office Action; Application No. 201010206753.X; dated Aug. 28, 2012; 20 pages.

European Extended Search Report; Application No. 11168598.8; dated Nov. 10, 2011; 7 pages.

European Examination Report; Application No. 11168598.8; dated Sep. 27, 2013; 9 pages.

European Extended Search Report; Application No. 12184642.2; dated Feb. 21, 2013; 7 pages.

Notice of Allowance dated Apr. 3, 2017; U.S. Appl. No. 13/177,791, filed Jul. 7, 2011; 20 pages.

European Examination Report; Application No. 11168598.8; dated Feb. 8, 2017; 10 pages.

European Examination Report; Application No. 12184642.2; dated Jan. 18, 2017; 6 pages.

European Summons to Attend Oral Proceedings; Application No. 11168598.8; dated Dec. 6, 2018; 8 pages.

European Summons to Attend Oral Proceedings; Application No. 12184642.2; dated Dec. 6, 2018; 7 pages.

\* cited by examiner

METHOD, DEVICES, AND SYSTEM FOR DETERMINING THE PRESENCE STATUS OF A MESSAGE RECIPIENT AND DISPLAYING THE NAME AND PRESENCE INDICATION OF ENTRIES IN AN ADDRESS BOOK MATCHING PARTIAL INPUT BASED ON THE LOCATION OF A MOBILE COMMUNICATION DEVICE

CROSS-REFERENCE TO RELATED APPLICATION

This application is a continuation of U.S. patent application Ser. No. 13/177,791 filed Jul. 7, 2011 by Jason Tyler Griffin entitled, "Method, Devices and System Having Out of Office Based Presence", which is a continuation of U.S. Pat. No. 7,984,105 issued on Jul. 19, 2011 entitled "Method, Devices and System Having Out of Office Based Presence", both of which are incorporated by reference herein as if reproduced in their entirety.

TECHNICAL FIELD

The present disclosure relates generally to presence systems and more particularly to a method, devices and system having out of office based presence.

BACKGROUND

Presence refers to a user's ability and/or willingness to participate in communications. Presence information, referred to as presence status or presence state, provides an indication of presence. Some types of messaging applications integrate presence status within the messaging environment. For example, instant messaging (IM) applications typically provide the presence status of the user's contacts or "buddies". However, presence status is not integrated in other types of messaging applications, or is not integrated effectively. For example, email messaging applications typically do not integrate presence status.

While some messaging applications have made presence status accessible to messaging servers, the presence information available to messaging servers and mobile communication devices communicating with such messaging servers has been limited in terms of integration and accessibility. For instance, a device user is typically not provided with the presence status of the recipient of the new electronic message during the composition of that message. Thus, there remains a need for presence systems which integrate presence status to a greater extent and in a more seamlessly manner.

BRIEF DESCRIPTION OF THE DRAWINGS

Like reference numerals are used in the drawings to denote like elements and features.

DETAILED DESCRIPTION OF EXAMPLE EMBODIMENTS

Figure 1:
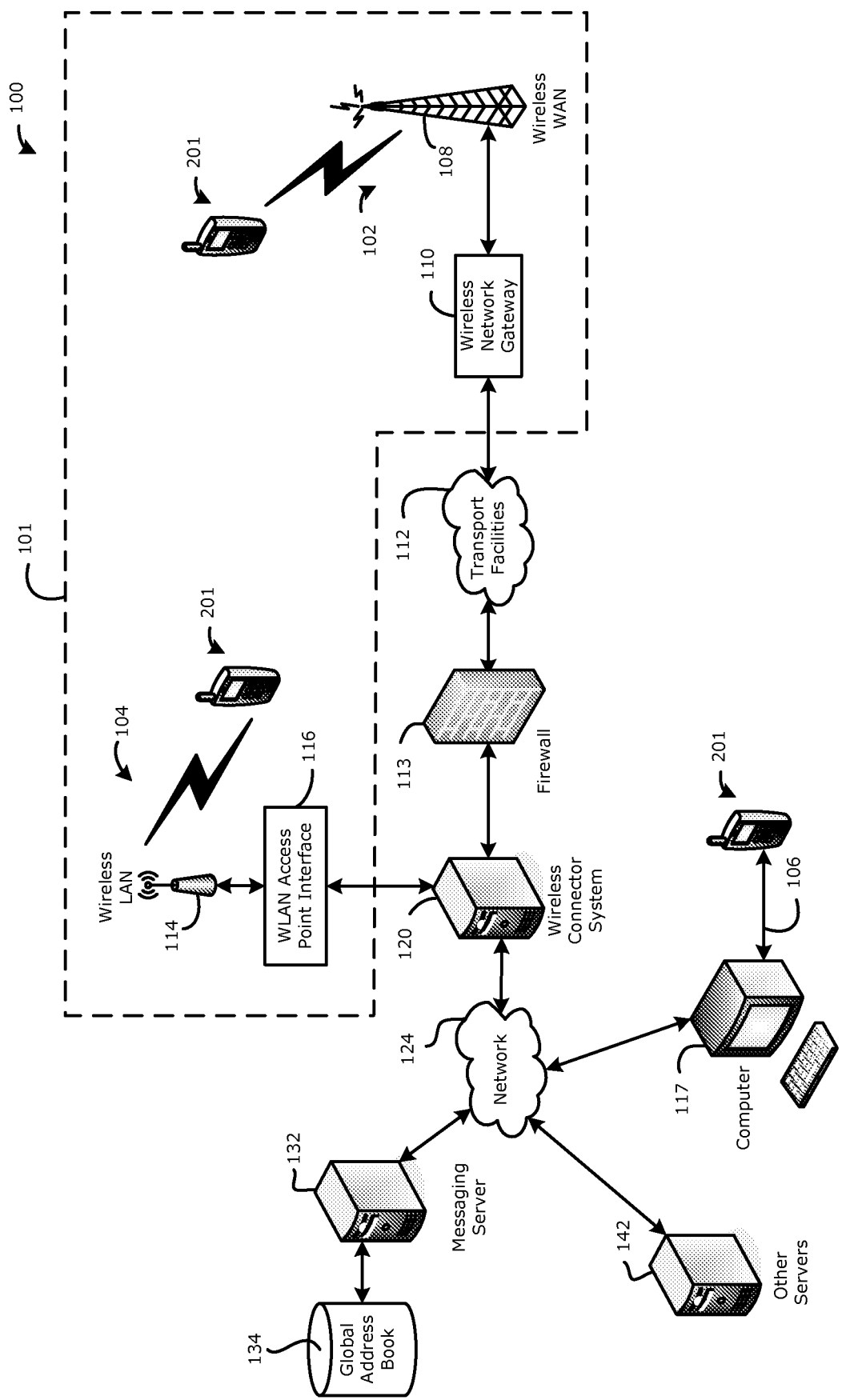
FIG. 1 is a block diagram illustrating a communication system including a mobile communication device in which example embodiments of the present disclosure can be applied.

The present disclosure provides a mechanism for obtaining presence status concerning users before those users are contacted. In particular, the present disclosure provides a mechanism for obtaining presence status regarding whether a user is out of office before a message is sent to the user. This allows a sender to send the message to a different user, to forego sending the message, or to select a different type of communication with which to contact the user. The basis for presence used in the present disclosure is the status of a user's out of office utility.

The teachings of the present disclosure, in at least some embodiments, can be used to integrate the functionality of the out of office utility with the global address book of an enterprise messaging server. The status of a user's out of office utility is used as a basis for presence and is sent to other users. The out of office presence status can be pushed or sent on demand to contacts of the device user and stored in the (local) personal address books of enterprise computers and mobile communication devices in a manner similar to instance message (IM) presence. In some embodiments, when a user's out of office utility is enabled, the out of office presence status is pushed to other users in the organization who have that user in their personal address book (i.e., pushed to the users' respective mobile communication devices and computers). Some or all of the contact of an out of office message used by the out of office utility could be sent with the out of office presence status to provide enhanced presence information if desired. When a user's out of office utility is disabled, the out of office presence status is again pushed to other users in their organization who have that user in their personal address book. Typically, the out of office presence status stored by the contacts is cleared (emptied).

In other embodiments, the out of office presence status is only sent on demand (i.e., when requested by one or more other users in the organization or applications or their respective mobile devices and/or computers) rather than being pushed. That, is the out of office presence status is pulled by respective mobile devices and/or computers. The request for out of office presence status may be sent manually by one more other users in response to corresponding input on their respective mobile devices and/or computers, or the request may be sent automatically by the respective mobile devices and/or computers in response to one of a number of trigger conditions. The trigger conditions for automatically request the out of office presence status may include input in a contact input field which matches the device user (i.e., input selecting the device user as an addressee or recipient of an electronic communication such as an email message, or a lookup which returns the device user), the display or selection of the device user's contact record in a personal address book of a mobile device and/or computer, or both.

In some embodiments, the out of office presence status could be pushed to all devices directly connected to the enterprise network, e.g. all computers connected to the network and all mobile devices connected to computers in the enterprise network by a wired or wireless link regardless of whether a user-initiated or automatic trigger is otherwise required. In such cases, the out of office presence status is not pushed to devices which are not directly connected to the enterprise network (e.g., mobile devices which are not connected to an enterprise computer).

After out of office presence status is received, regardless of the manner in which out of office presence status is sent, a visual indication of out of office presence status is displayed in a corresponding user interface screen on the display screen of the computer or mobile device. In some embodiments, an affirmative visual indication is displayed only when the presence status is "out of office". When the presence status is "in the office", the default user interface elements are used. When provided with the out of office presence status in the connect of a message composition user interface screen, the user may continue to send the message (possibly rewording the message in view of the out of office presence status), select another user to send the message to, or contact the device user via a different type of communication.

In accordance with one embodiment of the present disclosure, there is provided a method of sharing presence information performed by an electronic device and a messaging server, comprising: receiving input to enable an out of office utility for a first email account; notifying a messaging server managing the first email account that the out of office utility has been enabled; and providing to one or more recipients a presence status data packet indicating a presence status of "out of office" for a user associated with the first email account in response the enabling of the out of office utility.

In accordance with another embodiment of the present disclosure, there is provided a method of sharing presence information performed by a communication device, comprising: receiving input on the device to change the status of an out of office utility for a first email account; and notifying a messaging server managing the first email account when the status of the out of office utility has been changed including the changed status of the out of office utility. In at least some embodiments, the changed out of office status is stored in memory of the device. In at least some embodiments, the method further comprises receiving from the messaging server presence status data packets for contacts associated with the first email account when the status of the out of office utility of the contacts has changed, each presence status data packets including an presence status for a respective contact, the out of office presence status corresponding to the status of the out of office utility for the respective contact; storing the presence status contained in the presence status data packets in memory of the device; displaying a user interface screen on a display screen of the communication device configured for receiving input identifying one or more users; receiving input identifying one or more users via the user interface screen; and displaying in response to the received input a visual indication of presence status in the user interface screen for one or more users matching the input in accordance with the stored presence status.

In accordance with a further embodiment of the present disclosure, there is provided a method of sharing presence information performed by an electronic device, comprising: receiving a data packet having presence status associated with a first email account; and storing the presence status in association with a contact record which matches the first email account. In some embodiments, the method may further comprise: displaying a user interface screen of a personal address book on a display screen of the receiving electronic device, the user interface screen including a menu of contact entries corresponding to contact records of the personal address book; receiving selection input of one of the contact entries via the user interface screen; and displaying a visual indication of presence status in the user interface screen displayed on a display screen of the receiving electronic device in accordance with the stored presence status in response to the selection input. In other embodiments, the method may further comprise: displaying a user interface screen of a communication application on a display screen of the receiving electronic device; receiving input via the contact input field; and displaying a visual indication of presence status in the user interface screen displayed on a display screen of the receiving electronic device in accordance with the stored presence status in response to the input in the contact input field of the user interface screen.

In accordance with a further embodiment of the present disclosure, there is provided a communication device, comprising: a controller for controlling the operation of the device; a display screen connected to the controller; a communication subsystem connected to the controller configured for data communication with a communication network; the controller being configured to perform the above-described methods. The communication device may be a computer or a mobile communication device.

In accordance with a further embodiment of the present disclosure, there is provided a method of sharing presence information performed by a messaging server, comprising: receiving notifications when the status of the out of office utility of email accounts managed by the messaging server have changed; and providing presence status data packet to contacts associated with the email accounts when the status of the out of office utility of the contacts has changed. In at least some embodiments, the contacts are also managed by the messaging server.

In accordance with a further embodiment of the present disclosure, there is provided a method of sharing presence information performed by a messaging server, comprising: receiving notifications when the status of the out of office utility of email accounts managed by the messaging server have changed; identifying contacts stored in personal address books stored by the messaging server associated with the email accounts; and sending presence status data packets to the identified contacts when the status of the out of office utility of the contacts has changed.

In accordance with a further embodiment of the present disclosure, there is provided a messaging server, comprising: a controller; a communication subsystem connected to the controller configured for data communication with a communication network; the controller being configured to perform the above-described methods.

In accordance with yet further embodiments, there are provided computer program products comprising a computer readable medium having stored thereon executable program code for controlling the above-mentioned electronic devices, the executable program code causing the electronic devices to perform the methods described herein.

Communication System

Reference is first made to FIG. 1 which shows in block diagram form a communication system 100 in which example embodiments of the present disclosure can be applied. The communication system 100 comprises a number of mobile communication devices (mobile devices) 201 which may be connected to the remainder of system 100 in any of several different ways. Accordingly, several instances of mobile communication devices 201 are depicted in FIG. 1 employing different example ways of connecting to system 100. Mobile communication devices 201 are connected to a wireless communication network 101 which may comprise one or more of a Wireless Wide Area Network (WWAN) 102 and a Wireless Local Area Network (WLAN) 104 or other suitable network arrangements. In some embodiments, the mobile communication devices 201 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1) where each of the base stations 108 provides wireless Radio Frequency (RF) coverage to a corresponding area or cell. The WWAN 102 is typically operated by a mobile network service provider that provides subscription packages to users of the mobile communication devices 201. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), IDEN (integrated Digital Enhanced Network), EvDO (Evolution-Data Optimized) CDMA2000, EDGE (Enhanced Data rates for GSM Evolution), UMTS (Universal Mobile Telecommunications Systems), HSDPA (High-Speed Downlink Pakcet Access, IEEE 802.16e (also referred to as Worldwide Interoperability for Microwave Access or "WiMAX), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 which connects the mobile communication devices 201 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, which allows access to a network 124 such as an internal or enterprise network and its resources, or the wireless connector system 120 may be operated by a mobile network provider. In some embodiments, the network 124 may be realised using the internet rather than an internal or enterprise network.

The wireless network gateway 110 provides an interface between the wireless connector system 120 and the WWAN 102, which facilitates communication between the mobile communication devices 201 and other devices (not shown) connected, directly or indirectly, to the WWAN 102. Accordingly, communications sent via the mobile communication devices 201 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 201.

The WLAN 104 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 which may connect to the wireless connector system 120 directly (for example, if the access point 114 is part of an enterprise WLAN 104 in which the wireless connector system 120 resides), or indirectly via the transport facilities 112 if the access point 14 is a personal Wi-Fi network or Wi-Fi hotspot (in which case a mechanism for securely connecting to the wireless connector system 120, such as a virtual private network (VPN), may be required). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email messages, to and from a set of managed mobile communication devices 201. The wireless connector system 120 also provides administrative control and management capabilities over users and mobile communication devices 201 which may connect to the wireless connector system 120.

The wireless connector system 120 allows the mobile communication devices 201 to access the network 124 and connected resources and services such as a messaging server 132 (for example, a Microsoft Exchange™, IBM Lotus Domino™, or Novell GroupWise™ email messaging server) having a global address book 134, and optionally other servers 142. The other servers 142 may comprise a content server for providing content such as internet content or content from an organization's internal servers to the mobile communication devices 201 in the wireless network 101, and an application server for implementing server-based applications such as instant messaging (IM) applications.

The global address book 134 comprises electronic contact records created and maintained by an IT (information technology) administrator of the network 124. Typically, the global address book is maintained exclusively by the messaging server 132 and there is no local copy on the mobile device 201. In addition, the global address book typically comprises contact records for all users of the respective network 124 (e.g., enterprise). The contact records in the global address book 134 may be one or more of individual contact records (or user records) or a group address or distribution list which lists multiple individual (users).

The wireless connector system 120 typically provides a secure exchange of data (e.g., email messages, personal information manager (PIM) data, and IM data) with the mobile communication devices 201. In some embodiments, communications between the wireless connector system 120 and the mobile communication devices 201 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

The wireless network gateway 110 is adapted to send data packets received from the mobile device 201 over the WWAN 102 to the wireless connector system 120. The wireless connector system 120 then sends the data packets to the appropriate connection point such as the messaging server 132, content server 132 or application servers 136. Conversely, the wireless connector system 120 sends data packets received, for example, from the messaging server 132 or other server 142 to the wireless network gateway 110 which then transmit the data packets to the destination mobile device 201. The AP interfaces 116 of the WLAN 104 provide similar sending functions between the mobile device 201, the wireless connector system 120 and network connection point such as the messaging server 132, content server 132 and application server 136.

The network 124 may comprise a private local area network, metropolitan area network, wide area network, the public internet or combinations thereof and may include virtual networks constructed using any of these, alone, or in combination. Computers 117 may be connected to the network 124 directly or indirectly via an intermediate communication network such as the Internet 112. When computers 117 connect to the network indirectly, e.g. via the Internet 112, a VPN or other mechanism for securely connecting to the network 124 may be required. Computers 117 may be of any suitable construction and include at least a processor, and a display screen, one or more user input devices, and a memory each connected to the processor as is known in the art. The computers 117 could be desktop computers, laptop/notebook/netbook computers, or combinations thereof, and may have wired or wireless communication subsystems for connecting to the network 124.

A mobile device 201 may alternatively connect to the wireless connector system 120 using a computer 117 via the network 124. In at least some embodiments, for security purposes the computers 117 with which the mobile devices 201 can connect to the wireless connector system 120 are limited to computers 117 which are directly connected to the network 124. A link 106 may be provided for exchanging information between the mobile device 201 and computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile device 201 and computer 117. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

It will be appreciated that the above-described communication system is provided for the purpose of illustration only, and that the above-described communication system comprises one possible communication network configuration of a multitude of possible configurations for use with the mobile communication devices 201. The teachings of the present disclosure may be employed in connection with any other type of network and associated devices that are effective in implementing or facilitating wireless communication. Suitable variations of the communication system will be understood to a person of skill in the art and are intended to fall within the scope of the present disclosure.

Mobile Communication Device

Figure 2:
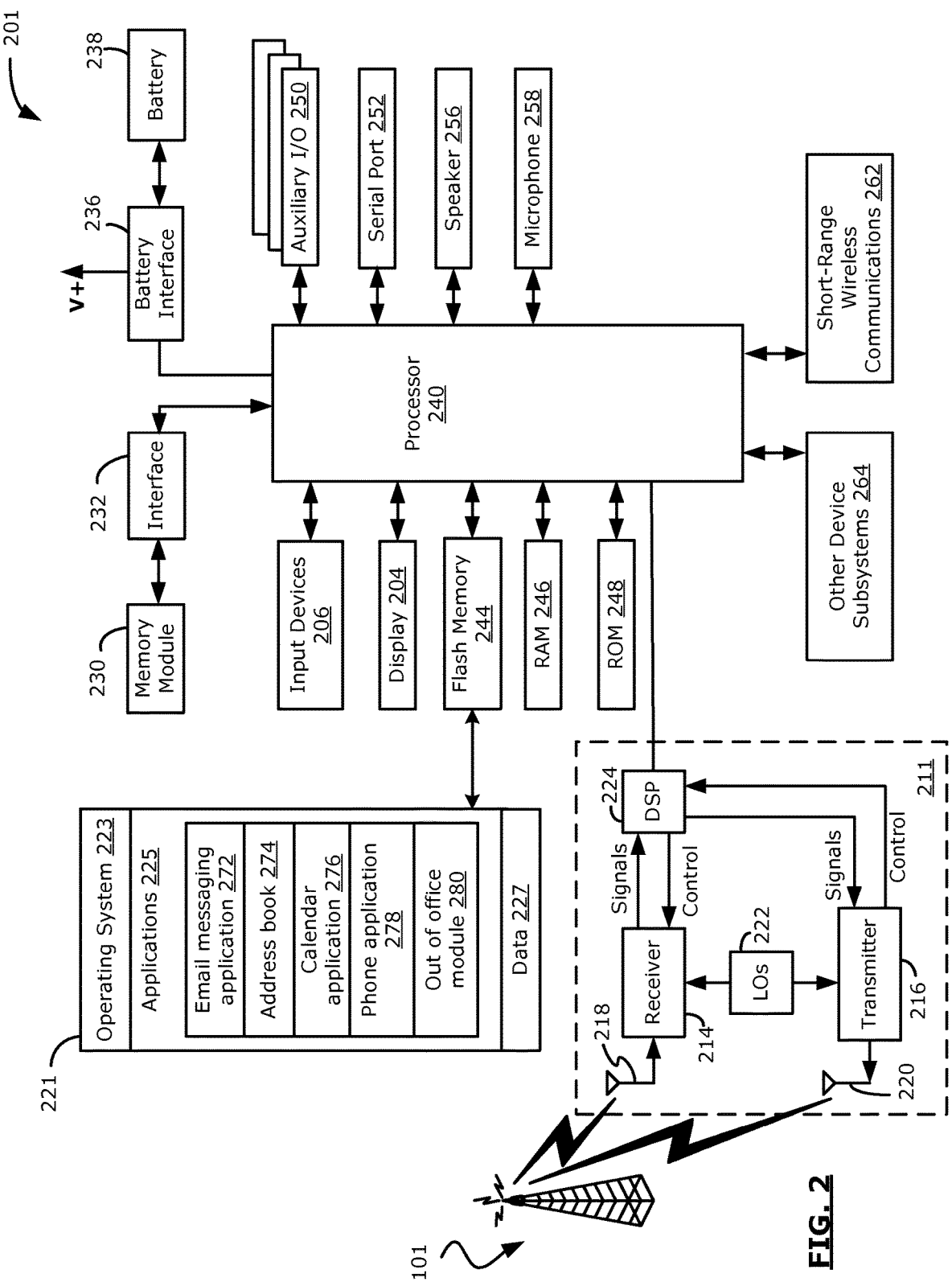
FIG. 2 is a block diagram illustrating a mobile communication device in accordance with one example embodiment of the present disclosure.

Reference is now made to FIG. 2 which illustrates a mobile device 201 in which example embodiments described in the present disclosure can be applied. The mobile device 201 is a two-way communication device having data and voice communication capabilities, and the capability to communicate with other computer systems, for example, via the Internet. Depending on the functionality provided by the mobile device 201, in various embodiments the device 201 may be a multiple-mode communication device configured for both data and voice communication, a smartphone, a mobile telephone or a PDA (personal digital assistant) enabled for wireless communication, or a computer system with a wireless modem.

The mobile device 201 includes a rigid case (not shown) housing the components of the device 201. The internal components of the device 201 are constructed on a printed circuit board (PCB). The mobile device 201 includes a controller comprising at least one processor 240 (such as a microprocessor) which controls the overall operation of the device 201. The processor 240 interacts with device subsystems such as a wireless communication subsystem 211 for exchanging radio frequency signals with the wireless network 101 to perform communication functions. The processor 240 interacts with additional device subsystems including a display screen 204 such as a liquid crystal display (LCD) screen, input devices 206 such as a keyboard and control buttons, flash memory 244, random access memory (RAM) 246, read only memory (ROM) 248, auxiliary input/output (I/O) subsystems 250, data port 252 such as serial data port, such as a Universal Serial Bus (USB) data port, speaker 256, microphone 258, short-range communication subsystem 262, and other device subsystems generally designated as 264. Some of the subsystems shown in FIG. 2 perform communication-related functions, whereas other subsystems may provide "resident" or on-device functions.

The device 201 may comprise a touchscreen display in some embodiments. The touchscreen display may be constructed using a touch-sensitive input surface connected to an electronic controller and which overlays the display screen 204. The touch-sensitive overlay and the electronic controller provide a touch-sensitive input device and the processor 240 interacts with the touch-sensitive overlay via the electronic controller.

The communication subsystem 211 includes a receiver 214, a transmitter 216, and associated components, such as one or more antenna elements 218 and 220, local oscillators (LOs) 222, and a processing module such as a digital signal processor (DSP) 224. The antenna elements 218 and 220 may be embedded or internal to the mobile device 201 and a single antenna may be shared by both receiver and transmitter, as is known in the art. As will be apparent to those skilled in the field of communication, the particular design of the wireless communication subsystem 211 depends on the wireless network 101 in which mobile device 201 is intended to operate.

The mobile device 201 may communicate with any one of a plurality of fixed transceiver base stations 108 of the wireless network 101 within its geographic coverage area. The mobile device 201 may send and receive communication signals over the wireless network 101 after the required network registration or activation procedures have been completed. Signals received by the antenna 218 through the wireless network 101 are input to the receiver 214, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 224. In a similar manner, signals to be transmitted are processed, including modulation and encoding, for example, by the DSP 224. These DSP-processed signals are input to the transmitter 216 for digital-to-analog (D/A) conversion, frequency up conversion, filtering, amplification, and transmission to the wireless network 101 via the antenna 220. The DSP 224 not only processes communication signals, but may also provide for receiver and transmitter control. For example, the gains applied to communication signals in the receiver 214 and the transmitter 216 may be adaptively controlled through automatic gain control algorithms implemented in the DSP 224.

The processor 240 operates under stored program control and executes software modules 221 stored in memory such as persistent memory, for example, in the flash memory 244. As illustrated in FIG. 2, the software modules 221 comprise operating system software 223, software applications 225 comprising an email messaging application 272 (also referred to as an email client 272), a personal address book 274, a calendar application 276, a phone application 278, and an out of office module 280. The out of office module 280 stores user preferences regarding whether to share out of office presence status with other users and processes received presence status data packets containing out of office presence status. The out of office module 280 may store the device user's out of office option setting, or this may be stored by the email client 272. The out of office option setting for other users may be stored in the out of office module 280, or in the personal address book 274.

User preferences regarding the out of office module 280 allow a user to determine whether the messaging server 132 and/or global address book 134 may publish and/or share the fact that the user's out of office utility has been enabled. User preferences may allow the user to limit who can access this information by individual users, user groups, or combinations thereof. If the user preferences specify that out of office status is not to be shared, or is only to be shared with specific users and/or user groups, the out of office status will only be available to the specified entities and will not be available to other entities. The user preferences may be defined by one or more predetermined presence rules stored in the out of office module 280, the messaging server 132, or both. The predetermined presence rules may include a predetermined presence rule which specifies whether presence status is to be shared. The predetermined presence rule may also define the one or more recipients to which the presence status is shared, possible by user name and/or user group.

The out of office module 280 is typically implemented as part of the email messaging application 272, whereas the modules 272-278 may be implemented as stand-alone software applications 225 or may be implemented together as part of a common software application 225 such as a personal information manager (PIM). However, the modules 272-280 could be implemented as a part of the operating system 223. In some example embodiments, the functions performed by one or more of the modules 272-280 may be realized as a plurality of independent elements, and any one or more of these elements may be implemented as parts of other software applications 225.

The personal address book 274 comprises electronic contact records created by the device user which are stored on the mobile device 201 in memory 244, and possibly in memory of the messaging server 132. A "local" copy of the personal address book 274 on the mobile device 201 may be synchronized with a "network" or "enterprise" copy maintained by the messaging server 132 so that the personal address book 274 may be accessed by the device user on either the mobile device 201 or an enterprise computer 117, or another computer with remote access to the network 124. It will be appreciated that contact names and other contact details may vary between the personal address book 274 and global address book 134 even when contact records correspond to the same user. The personal address book 274 is a custom personal address book and so is allowed to override the enterprise data in the global address book 134. It will also be appreciated that a given user A may have a user B in his or her personal address book 274, whereas user A may not be in user B personal address book 274. It is also conceivable that the personal address book 274 includes the same contact records as the global address book 134.

The software applications 225 also may include a range of applications, including, for example, a notepad application, Internet browser application, voice communication (i.e. telephony) application, mapping application, or a media player application, or any combination thereof. Each of the software applications 225 may include layout information defining the placement of particular fields and graphic elements (e.g. text fields, input fields, icons, etc.) in the user interface (i.e. the display screen 204) according to the application.

Those skilled in the art will appreciate that the software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

In some embodiments, the auxiliary I/O subsystems 250 may comprise an external communication link or interface, for example, an Ethernet connection. The mobile device 201 may comprise other wireless communication interfaces for communicating with other types of wireless networks, for example, a wireless network such as an orthogonal frequency division multiplexed (OFDM) network or a GPS (Global Positioning System) subsystem comprising a GPS transceiver for communicating with a GPS satellite network (not shown). The auxiliary I/O subsystems 250 may comprise a pointing or navigational input device such as a clickable trackball or scroll wheel or thumbwheel, or a vibrator for providing vibratory notifications in response to various events on the device 201 such as receipt of an electronic message or incoming phone call, or for other purposes such as haptic feedback (touch feedback).

In some embodiments, the mobile device 201 also includes a removable memory card or module 230 (typically comprising flash memory) and a memory card interface 232.

Network access typically associated with a subscriber or user of the mobile device 201 via the memory card 230, which may be a Subscriber Identity Module (SIM) card for use in a GSM network or other type of memory card for use in the relevant wireless network type. The memory card 230 is inserted in or connected to the memory card interface 232 of the mobile device 201 in order to operate in conjunction with the wireless network 101.

The mobile device 201 also stores other data 227 in an erasable persistent memory, which in one example embodiment is the flash memory 244. In various embodiments, the data 227 includes service data comprising information required by the mobile device 201 to establish and maintain communication with the wireless network 101. The data 227 may also include user application data such as email messages, address book and contact information, calendar and schedule information, notepad documents, image files, and other commonly stored user information stored on the mobile device 201 by its user, and other data. The data 227 stored in the persistent memory (e.g. flash memory 244) of the mobile device 201 may be organized, at least partially, into a number of databases each containing data items of the same data type or associated with the same application. For example, email messages, contact records, and task items may be stored in individual databases within the device memory.

The serial data port 252 may be used for synchronization with a user's host computer system (not shown). The serial data port 252 enables a user to set preferences through an external device or software application and extends the capabilities of the mobile device 201 by providing for information or software downloads to the mobile device 201 other than through the wireless network 101. The alternate download path may, for example, be used to load an encryption key onto the mobile device 201 through a direct, reliable and trusted connection to thereby provide secure device communication.

In some embodiments, the mobile device 201 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile device 201 to the host computer system via a USB cable or Bluetooth® connection, traffic that was destined for the wireless network 101 is automatically routed to the mobile device 201 using the USB cable or Bluetooth® connection. Similarly, any traffic destined for the wireless network 101 is automatically sent over the USB cable Bluetooth® connection to the host computer system for processing.

The mobile device 201 also includes a battery 238 as a power source, which is typically one or more rechargeable batteries that may be charged, for example, through charging circuitry coupled to a battery interface such as the serial data port 252. The battery 238 provides electrical power to at least some of the electrical circuitry in the mobile device 201, and the battery interface 236 provides a mechanical and electrical connection for the battery 238. The battery interface 236 is coupled to a regulator (not shown) which provides power V+ to the circuitry of the mobile device 201.

The short-range communication subsystem 262 is an additional optional component which provides for communication between the mobile device 201 and different systems or devices, which need not necessarily be similar devices. For example, the subsystem 262 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile device 201 during or after manufacture. Additional applications and/or upgrades to the operating system 221 or software applications 225 may also be loaded onto the mobile device 201 through the wireless network 101, the auxiliary I/O subsystem 250, the serial port 252, the short-range communication subsystem 262, or other suitable subsystem 264. The downloaded programs or code modules may be permanently installed, for example, written into the program memory (i.e. the flash memory 244), or written into and executed from the RAM 246 for execution by the processor 240 at runtime. Such flexibility in application installation increases the functionality of the mobile device 201 and may provide enhanced on-device functions, communication-related functions, or both. For example, secure communication applications may enable electronic commerce functions and other such financial transactions to be performed using the mobile device 201.

The mobile device 201 may provide two principal modes of communication: a data communication mode and an optional voice communication mode. In the data communication mode, a received data signal such as a text message, an email message, or Web page download will be processed by the communication subsystem 211 and input to the processor 240 for further processing. For example, a downloaded Web page may be further processed by a browser application or an email message may be processed by the email messaging application and output to the display 204. A user of the mobile device 201 may also compose data items, such as email messages, for example, using the input devices in conjunction with the display screen 204. These composed items may be transmitted through the communication subsystem 211 over the wireless network 101.

In the voice communication mode, the mobile device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., the voice communication module) and hardware (i.e., the microphone 258, the speaker 256 and input devices). Alternative voice or audio I/O subsystems, such as a voice message recording subsystem, may also be implemented on the mobile device 201. Although voice or audio signal output is typically accomplished primarily through the speaker 256, the display screen 204 may also be used to provide an indication of the identity of a calling party, duration of a voice call, or other voice call related information.

Out of Office Presence Status

Figure 3:
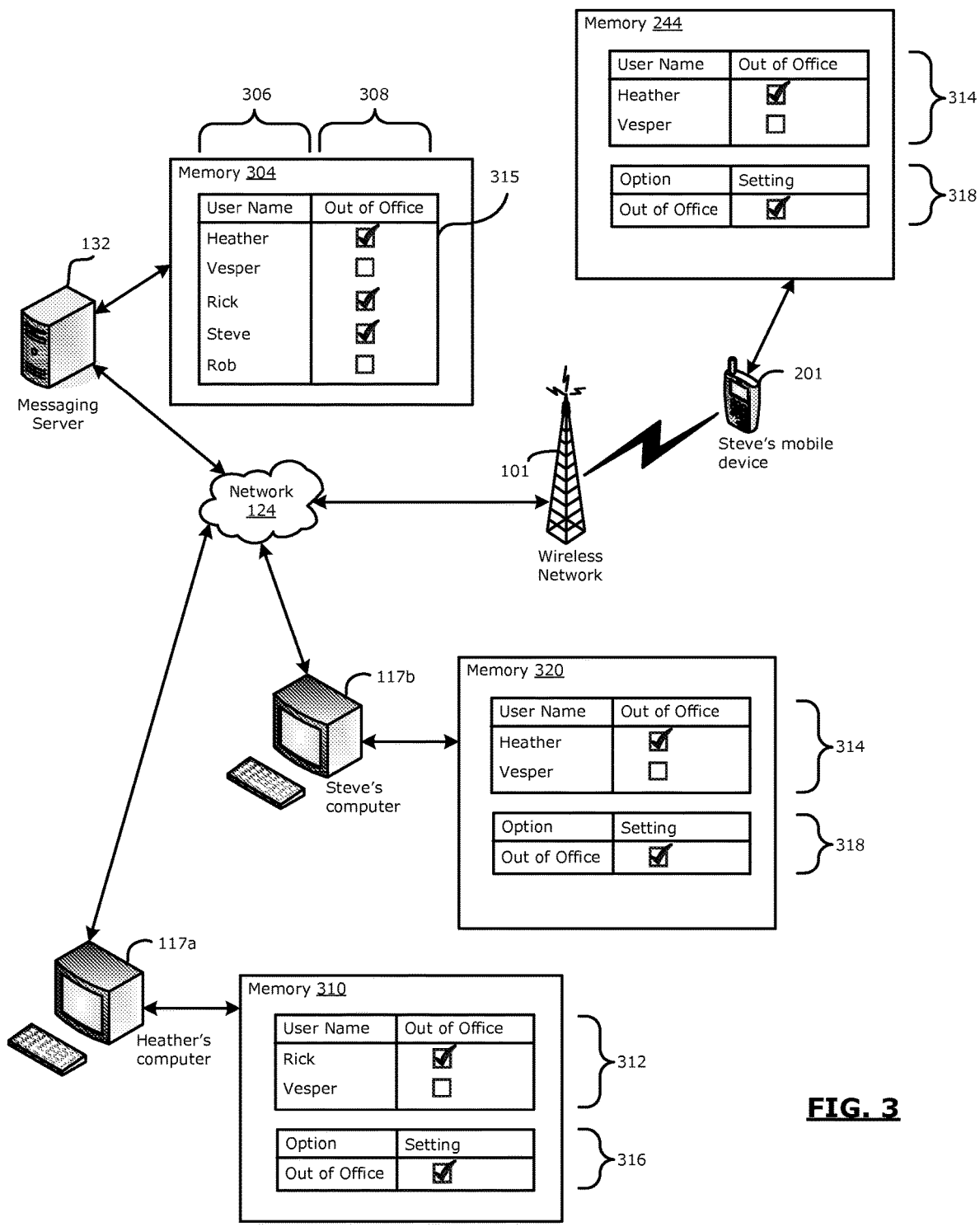
FIG. 3 is a block diagram illustrating the location of stored out of office presence status in accordance with one example embodiment of the present disclosure.

Referring now to FIG. 3, an example use case illustrating the sharing of out of office presence status in accordance with one example embodiment of the present disclosure will be described. As noted above in connection with FIG. 1, the messaging server 132 of the communication system 100 connects to network computers 117 either directly via a wired or wireless link to the network 124 or indirectly via an intermediate communication network such as the Internet 112. The computers 117 operate under stored program control and executes software modules stored in memory. The software modules include an email client 272 which is compatible with the messaging server 132. The email client 272 could be part of a personal information manager (PIN). In some embodiments, the email client 272 on the computers 117 could be Microsoft Office™ client and the messaging server 132 could be a Microsoft Exchange™ server. When connecting indirectly (e.g. remotely) to the messaging server 132, the email client 272 on the computers 117 could be a Web-based email client 272 such as Microsoft Office™ Web Access client.

The software modules stored on the computers also comprise operating system software 223, software applications 225 comprising an address book 274, a calendar application 276 and an out of office module 280. The email client 272, address book 274, calendar application 276 and out of office module 280 may be implemented together as part of a common software application such as a personal information manager (PIM) as with the mobile devices 201.

The email clients 272 on the computers 117 and mobile devices 201 and the messaging server 132 are configured to support an out of office utility (commonly referred to as an Out Of Office Assistant) for email accounts managed by the messaging server 132. The out of office utility generates automatic replies to received email messages addressed sent to the email account (i.e., address to an email address of the email account) when enabled. These automatic replies are referred to as out of office replies. An out of office reply is a reply email message sent to the sender of the received email message. The out of office reply has a message body which typically includes predefined text set by the device user; however, the message body could include text which is dynamically generated based on the received email message. Typically out of office replies are sent by the messaging server 132; however, out of office replies could be sent by the email client 272 on a computer 117 or mobile device 201.

The out of office utility can be enabled and disabled by changing the corresponding option setting accordingly. Typically, the out of office utility is enabled and disabled by the device user but could be enabled and disabled automatically in response to a trigger condition. The trigger condition may be the meeting of predetermined conditions including, but not limited to, calendar event data from the calendar application 276 for a particular time slot matching a rule that specifies the device user is out of office. In other words, when calendar event data indicates that the device user is out of office, this could trigger the out of office utility to be enabled. Similarly, when calendar event data indicates that user is in the office, or at least does not indicate that the device user is out of office, this could trigger the out of office utility to be disabled.

The option setting for each email account is stored on a mobile device 201 which is associated with the email account and the messaging server 132 managing the email account. The out of office option setting is typically stored on the mobile device 201 because it is indirectly connected to the messaging server 132 and therefore may have only intermittent communication with the messaging server 132 via the wireless network 101 at times. Accordingly, the out of office option setting may not be readily available to the device user if not stored on the mobile device 201. However, it is possible that the out of office option setting is stored only on the messaging server 132 and a lookup is performed as required. The out of office option setting could be stored on one or more computers 117 when the email client 272 on such computers 117 is or has been used to access the email account.

When users enable or disable the out of office utility from their computers 117 or mobile devices 201, the corresponding option setting change is sent to the messaging server 132. Similarly, when users disable their out of office utility from their computers 117 or mobile devices 201, the corresponding option setting change is sent to the messaging server 132.

Referring again to FIG. 3, the messaging server 132 is shown connected to two computers 117 represented individually as computers 117a and 117b, and to a mobile device 201 via the wireless network 101. In the shown example, the first computer 117a is associated with the user "Heather" (referred to as "Heather's computer") and the second computer 117b is associated with a user "Steve" (referred to as "Steve's computer"). The mobile device 201 is also associated with the user "Steve" (referred to as "Steve's mobile device"). For the purpose of illustration, an enabled out of office option setting is shown using a check box with a corresponding check whereas a disabled option setting is shown using an empty check box. In practice, any suitable mechanisms for storing option settings may be used. The manner in which the out of office option setting is stored by the email client 272 and messaging server 132 does not affect the teachings of the present disclosure and is not intended to be limiting.

The messaging server 132 has a memory 304 which stores, among other things, user names 306 and out of office option settings 308 for email accounts managed by the messaging server 132 (in the shown example, email accounts for device users "Heather", "Vesper", "Rick", "Steve" and "Rob" are shown). The messaging server 132 also stores other information including, but not limited to, the email addresses of the email accounts managed by the messaging server 132. The user names 306 and out of office option settings 308 may be stored in a data table 315 or resolved into a logical table at runtime when required.

The computers 117a and 117b each have a memory 310 and 320 respectively for storing data such as out of office option settings 312, 314 for other users, as well as the device user's own out of office option settings 316, 318. In the shown embodiment, the out of office option settings 312, 314 for other users are limited to those users who are in the device user's personal address book. The out of office option settings 312, 314 are stored in association with the respective user names of the contacts. The out of office option settings 312, 314 for other users may be stored in the respective contact records for those users in the personal address book.

The mobile device 201 stores out of office option settings 322 for other users as well as the device user's own out of office option settings 332 in its memory 244. In the shown embodiment, the out of office option settings 322 for other users are limited to those users who are in the respective device user's personal address book 274 (FIG. 2). The out of office option settings 322 for other users may be stored in the respective contact records for those users in the personal address book 274.

As shown in FIG. 3, the user Heather has the out of office utility enabled as indicated by the out of office option setting 316 in stored in the memory 310 of the computer 117a. While not shown in FIG. 3, if the user Heather had a mobile device 201 with an email account managed by the messaging server 132, the out of office option setting would also be stored in the memory 244 of her mobile device 201. The corresponding out of office option setting for user Heather is also stored by the messaging server 132 in its memory 304 along with the settings for the other users who have an email account managed by the messaging server 132 (in the shown example, email accounts for device users "Heather", "Vesper", "Rick", "Steve" and "Rob"). Heather's computer 117a also stores the out of office option settings 312 for the user's Rick and Vesper as these users are in Heather's personal address book 274.

The user Steve also has the out of office utility enabled as indicated by the out of office option setting 318 in stored in the memory 320 of the computer 117b. Steve's computer 117b also stores the out of office option settings 314 for the user's Heather and Vesper as these users are in Steve's personal address book 274. Steve's mobile device 201 has the out of office option settings 314, 318 stored in the memory 244. Thus, both the computer 117b and mobile device 201 have access to the same out of office option settings 314, 318. The corresponding out of office option setting 318 for user Steve is also stored by the messaging server 132 in its memory 304.

Figure 4A:
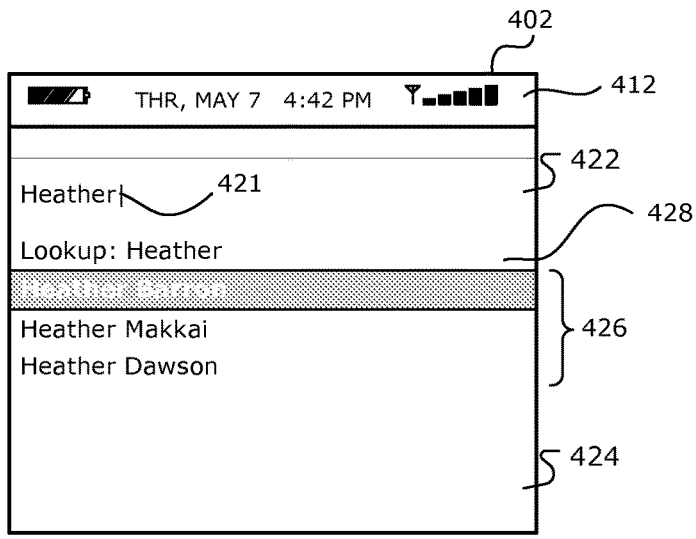
FIG. 4A-C illustrate example dialing user interface screens for a phone application for a mobile device in accordance with one example embodiment of the present disclosure.
Figure 4B:
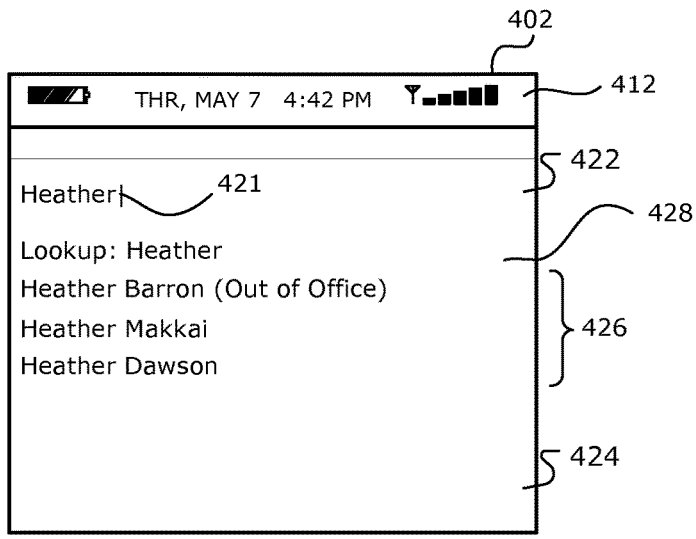
Figure 4C:
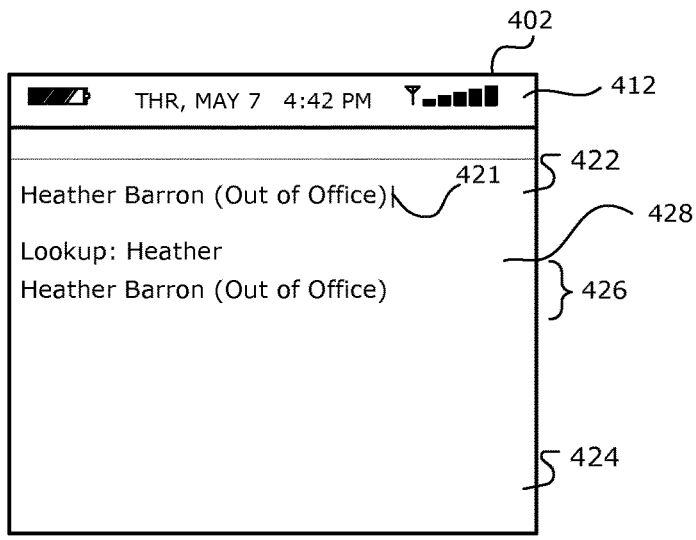

Referring now to FIG. 4A to 4C, an example dialing user interface screen 402 of the phone application 278 which is configured to display out of office presence status will now be described. The dialing screen 402 includes a dialing field 422 for entry of an input comprising a telephone number or contact name of a party to be called. In the dialing user interface screen 402 shown in FIGS. 4A and 4B, the name "Heather" has been input in the dialing field 422. The dialing field 422, in at least some embodiments, is the active field of the dialing screen 402 when it is invoked. A cursor 421 (also referred to as a caret) is provided within the dialing user interface screen 402. The cursor 421 functions as a text cursor within dialing field 422 but may function as a navigation cursor in other fields. The cursor 421 is an onscreen indicator used to show a position on the display 204 which responds to text input and/or navigational input from the input and navigational input devices of the device 201, respectively. As will be appreciated by persons skilled in the art, text input via the respective input devices will cause the processor 240 to display corresponding text at the position of the cursor 421, and navigational input from respective navigational input devices will cause the processor 240 to move the cursor 421 between selectable fields of the dialing screen 402. In the shown embodiment, the dialing screen 402 also includes a status bar 412 which displays information such as the current date and time, icon-based notifications, device status and/or device state.

The dialing screen 402 also includes a contact menu 424 which displays a list of contacts 426 which match the input in the dialing field 422. In the dialing user interface screen 402 shown in FIGS. 4A and 4B, the contacts "Heather Barron", "Heather Makkai" and "Heather Dawson" were found to match the input "Heather" in the dialing field 422. The contact name and possibly telephone number of the matching contact records are listed in the contact menu 424 within the list 426. The number of contacts which match the input in the dialing field 422 may exceed the number of references which can fit within the menu 424. In such cases, the contact menu 424 may be scrollable so that contact records which are not shown in the contact menu 424 can be displayed and reviewed by the device user. A scroll bar (not shown) may be provided as an indication of the availability of scrolling, as well as providing a scrolling mechanism and an indication of the relative size of the list of contacts 426.

In some embodiments, the phone application 278 performs a local lookup operation in which the input of the dialing field 422 is compared to electronic contact records in a personal address book 274 stored in the memory 244. As the input in the dialing field 422 changes (e.g., more characters are added or characters are removed or changed), the phone application 278 re-compares the input in the dialing field 422 to the electronic contact records in the personal address book 274 to dynamically generate the list of contacts 426 based on the input in the dialing field 422. In some embodiments, the lookup may be repeated at predetermined durations (e.g. every few seconds), after each character change, or after a predetermined number of character changes in the dialing field 422. In some embodiments, the input in the contact input field is compared automatically to the personal address book to identify any matching contacts without user input. In other embodiments, input could be required to perform a local lookup operation.

The contact menu 424 may also include a lookup field 428 for performing a lookup of the global address book 134 (also referred to as a network or enterprise address book). In some embodiments, activating the lookup field 428 instructs the mobile device 201 to perform a lookup operation on the input in the lookup field 428 in the global address book 134 (e.g., to perform a lookup for the contact name "Heather" in the global address book 134 as shown in FIGS. 4A and 4B). The lookup field 428, in at least some embodiments, is automatically populated with the input from the dialing field 422 (the input "Heather" is illustrated in FIGS. 4A and 4B). In some embodiments, the lookup field 428 requires input to perform a lookup operation. That is, while the input from the dialing field 422 is automatically populated in the lookup field 428, the lookup operation is not performed without input to perform the operation. In some embodiments, the user can change the active field to be the lookup field 428 by corresponding navigational input via the navigational input device, for example by moving a scroll wheel or trackball downwards towards the lookup field 428 from the dialing field 422, or using corresponding directional input via a touchscreen. In other embodiments, the input of the lookup field 428 must be input directly via respective user input.

As part of the lookup operations for populating the contact menu 424, the out of office option settings 314 stored on the mobile device 201 are checked for contacts which match the input in the dialing field 422. When the out of office option settings 314 indicate that the out of office option setting is enabled for a user, a visual indication of the out of office presence status is displayed within the dialing screen 402. In FIG. 4A, the visual indication of presence status when the device user is out of office is provided by the colour of the background and the colour of the text of the corresponding entry in the list of contacts 426. For example, in FIG. 4A, the colour of the background and the colour of the text of the corresponding entry for the user "Heather Barron" indicates that she has her out of office utility enabled, whereas the colour of the background and the colour of the text of the corresponding entry for the users "Heather Makkai" and "Heather Dawson"" indicates that these users do not have their out of office utility enabled.

In some embodiments, the colour of the background could be blue and the colour of the text could be white when the user is out of office, whereas the colour of the background could be white and the colour of the text could be black when the user is in the office. In other embodiments, only one of the background colour and text colour may be changed. For example, the colour of the text may be red when the user is out of office but black when the user is in the office. In other embodiments, different colours may be used as the default background colour and text colour. For example, users who are "out of office" may be un-selectable elements in the user interface screen and "grey-out" or having a strike through extending through their user name. In yet other embodiments, presence status could be indicated by other means such as a corresponding icon, text label or both, in addition to, or instead of, changing the colour of the background and/or text of the corresponding entry in the list of contacts 426. FIG. 4B illustrates such an alternative embodiment in which the visual indication is a text label "Out of Office" in brackets following the contact name. In yet other embodiments, presence status could be indicated by a pop-up window or other suitable means.

If no out of office presence status is stored, no visual indication of the presence status of users is provided in the dialing screen 402. Instead, the user contact names, telephone numbers, or both are displayed without any additional information.

In FIG. 4C, more characters have been added to the dialing field 422 so that the input is unambiguously identified in the personal address book 274. That is, the input of "Heather Barron" in the dialing field 422 returns a single match from the personal address book 274. At this time, a visual indication of the presence status could be provided in the dialing field 422 as shown in FIG. 4C rather than the contact menu 424. In FIG. 4C, the text label "Out of Office" is provided in brackets following the contact name; however, the presence status may be indicated by any suitable means.

Figure 5A:
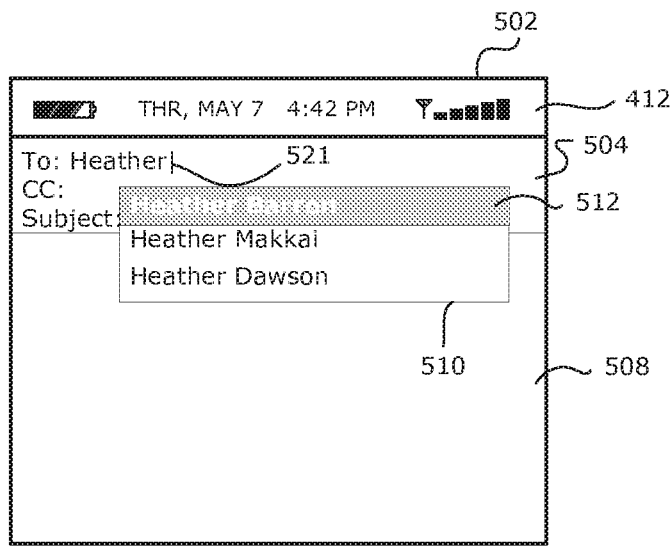
FIG. 5A-C illustrate example email composition user interface screens for an email application for a mobile device in accordance with one embodiment of the present disclosure.
Figure 5B:
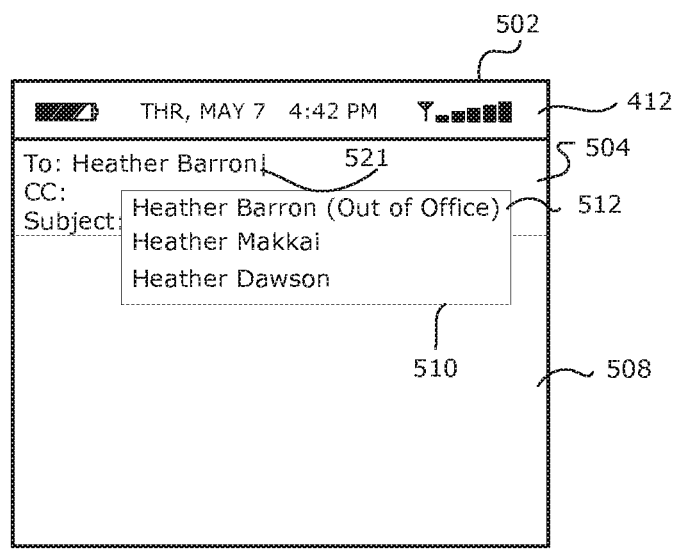
Figure 5C:
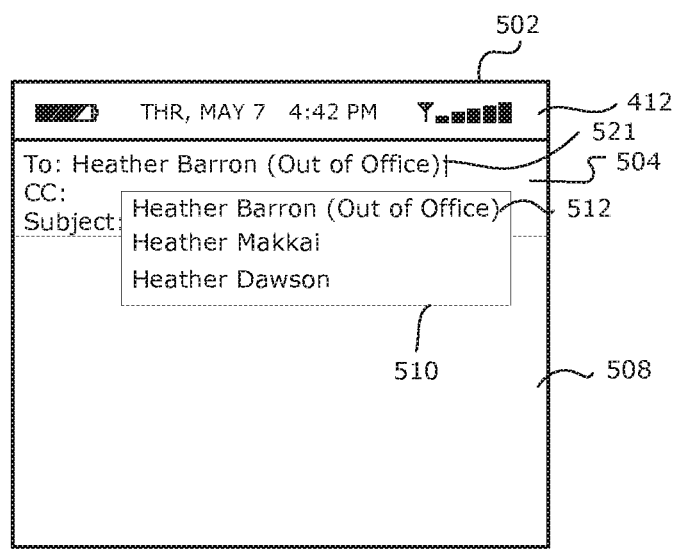

Referring now to FIG. 5A-5C, an example email message composition user interface screen 502 for the email messaging application 272 for the mobile device 201 will now be described. The email message composition screen 502 includes an address portion 504 including a "To" address field, "CC" address field and "Subject" field. A "BCC" address field (not shown) could also be included in other embodiments. The operation and use of such fields is known in the art and will not be described herein. The email message composition screen 502 also includes a message body field 508 for entry of a message. The email message composition screen 502 is provided with a cursor 521 which is navigable within and between the respective fields of the address portion 504, and between the address portion 504 and message body field 508.

When one of the address fields is active, i.e. when one of the "To" "CC" or "BCC" fields is active, entry of an input causes the processor 240 to perform a local lookup operation of the input in the respective field to contact records in the personal address book 274 to determine if the input matches any contacts records. The lookup operation comprises comparing the input to one or more fields of the contact records. Typically, the fields used in comparison comprise at least the name field but may also comprise one or more of the company/organization field, title/department field, email address field or other text fields of the contact records in the personal address book 274. Typically, the results of the lookup operation are displayed in a contact menu which, in the shown embodiment, is a pop-up window 510 adjacent to the address field which overlays a portion of the email message composition screen 502. In other embodiments, the contact menu results of the lookup operation could be provided inline within the email message composition screen 502 rather than being displayed in the pop-up window 510. In some embodiments, the input in the contact input field is compared automatically to the personal address book to identify any matching contacts without user input. In other embodiments, input could be required to perform a local lookup operation.

The pop-up window 510 is populated with a list of contact names 512 of the contact records which match the input in the address field. In other embodiments, the pop-up window 510 may be populated with a list of email addresses of the contact records which match the input in the address field. The type and nature of the displayed information in the pop-up window 510 may be determined in accordance with predetermined settings. The pop-up window 510 may also include a lookup field 512 similar to the lookup field 428. Alternatively, the lookup field 512 may be invoked from the email message composition screen 502, for example from the address field, by causing an options menu to appear and selecting a corresponding menu item requesting the lookup field 512 to be displayed.

When activated, for example in the manner described above in connection with the lookup field 428, the lookup field 512 performs a lookup on the global address book 134 to find contact records which match the input in the address field. Upon receiving input to perform a lookup, the processor 240 instructs the messaging server 132 to compare the lookup field input to the contact records in the global address book 134, the messaging server 132 determines which contact records match the lookup field input, and returns contact information to the mobile device 201 about the contact records that match the lookup field input. The comparison may be based on one or more of the fields of the contact records in the global address book 134. The comparison is typically based on at least the name field of the contact records, but could also be performed on other fields of the contact records such as organization.

As part of the lookup operations for populating the pop-up window 510, the out of office option settings 314 stored on the mobile device 201 are checked for contacts which match the input in the address field. When the out of office option settings 314 indicate that the out of office option setting is enabled for a user, a visual indication of the out of office presence status is displayed within the email message composition screen 502. In FIG. 5A, the visual indication of presence status when the device user is out of office is provided by the colour of the background and the colour of the text of the corresponding entry in the pop-up window 510. For example, in FIG. 5A, the colour of the background and the colour of the text of the corresponding entry for the user "Heather Barron" indicates that she has her out of office utility enabled, whereas the colour of the background and the colour of the text of the corresponding entry for the users "Heather Makkai" and "Heather Dawson"" indicates that these users do not have their out of office utility enabled. FIG. 5B illustrates such an alternative embodiment in which the visual indication is a text label "Out of Office" in brackets following the contact name. In yet other embodiments, presence status could be indicated by a pop-up window or other suitable means.

In FIG. 5C, more characters have been added to the address field so that the input is unambiguously identified in the personal address book 274. That is, the input of "Heather Barron" in the address field returns a single match from the personal address book 274. At this time, a visual indication of the presence status could be provided in the address field as shown in FIG. 5C rather than the pop-up window 510. In FIG. 5C, the text label "Out of Office" is provided in brackets following the contact name; however, the presence status may be indicated by any suitable means.

Lookup operations of the email messaging application 272, phone application 278 and possibly other applications may be performed by separate lookup modules or a common lookup module. A common lookup module provides centralized lookup capabilities for contact information for the mobile device 201. The common lookup module could be part of the operating system 223 in some embodiments. This may increase computational efficiency by reducing the processing required by the mobile device 201, at least in part, by delegating responsibilities to aspects of the device software which are below the application level, such as to the operating system 223.

While the foregoing examples are directed to the provision of presence status in the context of the email messaging application 272 and phone application 278, it will be appreciated that presence status could also be provided in other communication applications which, in some embodiments, could be a text messaging application for sending SMS, MMS or other text messages, peer-to-peer device messaging application for sending peer-to-peer device messages, an IM application for sending instant messages, a chat application, or a personal address book. Moreover, while example user interface screens have been described in the context of the email messaging application 272 and phone application 278, it will be appreciated that presence status could be provided in user interface screens of these and other communication applications. Moreover, the foregoing presence scheme uses "in the office" as a default presence status as this tends to be the normal circumstance. Accordingly, no affirmative visual indication is provided when a user is "in the office". That is, no icon, text or other visual indication is added to the user interface screen when a user is "in the office". The default text and background are used to display the contact name and/or other information. Nevertheless, the user's presence status of "in the office" can be determined by a device user by a lack of any affirmative visual indication. This avoids unnecessarily cluttering user interface screens.

In other embodiments, an affirmative visual indication could be provided when a user is "in the office" to provide affirmative presence status for all users. For example, an icon, text label such as "In the Office" in brackets following the user name, or other affirmative visual indication could be provided. Additionally, a visual indication that no presence information is available could be displayed when no presence status is available.

In other embodiments, rather than storing out of office option settings in the memory of the computers 117 and/or mobile device 201, out of office presence status could be looked up on the messaging server 312 in response to detection of a trigger condition, and sent to the requesting computer 117 or mobile device 201. In this manner, out of office presence status could be determined for contacts in personal address book 274, global address book 134 or both. In such embodiments, the operations 600 further comprises monitoring for trigger conditions for sending presence status, and sending the presence status data packet to the one or more recipients in response to detection of a trigger condition.

The trigger condition could be one of (1) inputting any number of characters in a contact input field of the communication application (2) inputting a predetermined number of characters in the contact input field of the communication application, (3) inputting an input in the contact input field which matches a predetermined number of contact records in the personal address book 274 or global address book 134, (4) a request via predetermined input to obtain out of office presence status for a particular contact or user, or (5) selection input selecting a specific contact which could be input in the contact input field of the communication application which unambiguously identifies a contact in the personal address book 274 or which is a predetermined selection input.

The use of a trigger condition for sending presence information to computers 117 and/or mobile device 201 may reduce the amount of data transmitted compared with pushing out of office presence status. The reduction in the amount of data transmitted may reduce operating costs due to the resulting reduction in data charges when transmitting data to mobile devices 201. The described trigger conditions provide different balances between data efficiency and user convenience. For example, trigger condition (1) is relatively inefficient in that no filters are used. That is, a lookup may be performed as soon as the device user enters any input in the contact input field. Trigger conditions (2) and (3) are more efficient in that the number of matching contacts has been reduced compared with trigger condition (1). Trigger conditions (4) and (5) are the most efficient in that the contact is limited to a particular contact.

In some embodiments, out of office presence status stored by the messenger server 132 can be accessed and pushed by the wireless connector system 120 to mobile devices 201 for all contacts in a user's personal address book but is not pushed to the computers 117 via the messenger server 132. Instead, the computers 117 perform a lookup of the messaging server 132 as described above. This embodiment takes advantage of the increased connection speed between the computers 117 and messaging server 132 and the absence of a data charges for data exchanged within the network 124. Pushing out of office presence status to mobile devices 201 and storing it on the mobile devices 201, however, increases response time when accessing out of office presence status on the mobile devices 201. This solution reduces or eliminates problems associated with the indirect connection between the mobile devices 201 and the messaging server 132, and the potential for intermittent communication between mobile devices 201 and the messaging server 132 via the wireless network 101. While possibly requiring more data to be transmitted to the mobile devices 201, this embodiment attempts to make out of office presence status readily available to device users of mobile devices 201.

While presence status has been described as being "out of office" or "in the office", other binary presence status indicators could be used. Other suitable presence status indicators include "available" or "unavailable", "present" or "not present", "able to communicate" and "unable to communicate". These presence status indicators are provided for purposes of illustration and are not intending to be limiting. In addition, while examples of visual indications of presence status have described in the context of example user interface screens, these are merely for purposes of illustration. The present disclosure is not intended to be limited to any particular scheme for providing a visual indication of presence status.

Figure 6A:
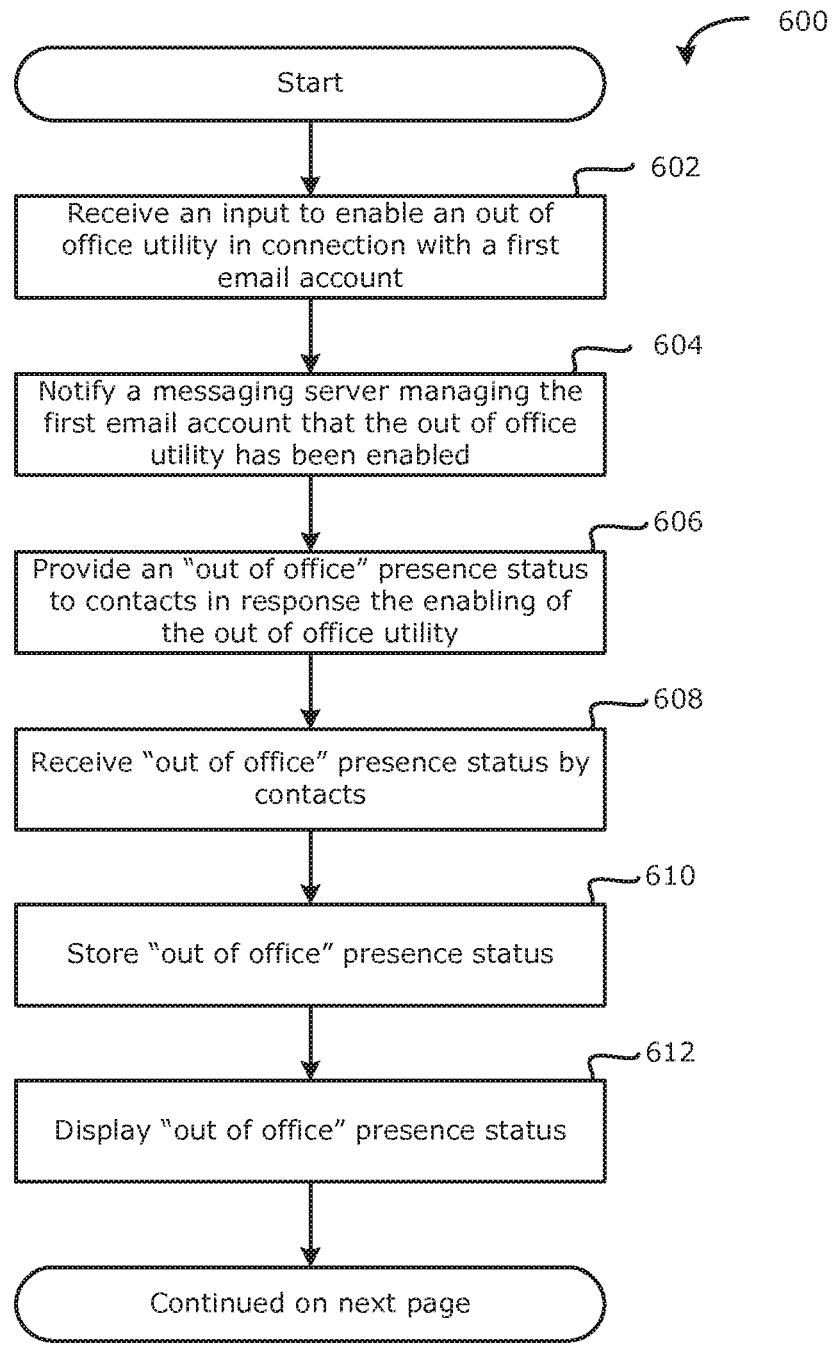
FIGS. 6A-B illustrate a flowchart of an example method of sharing presence information in accordance with one example embodiment of the present disclosure.
Figure 6B:
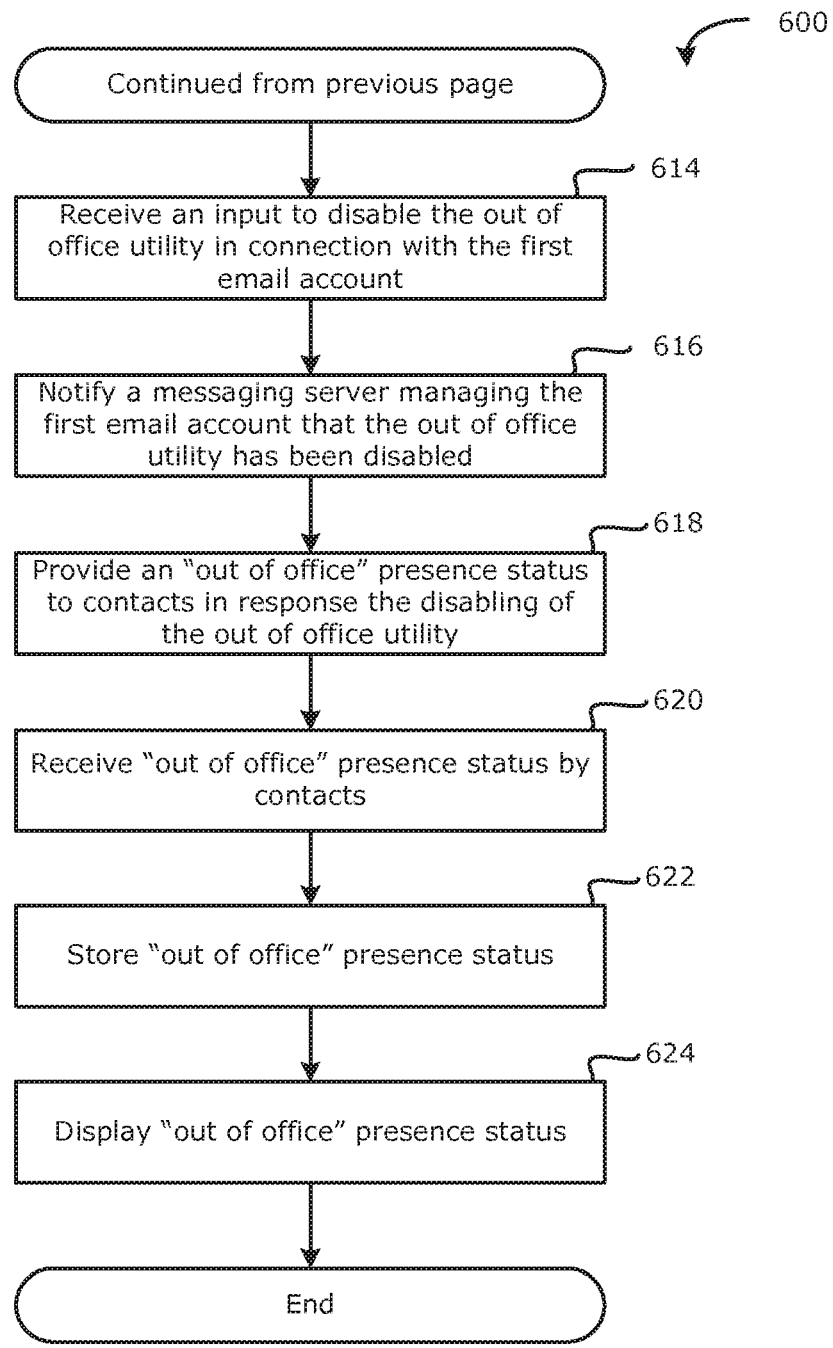

Referring now to FIGS. 6A-B, an example method of sharing presence information in accordance with one example embodiment of the present disclosure will be described. In the first step 602, the email client 272 receives input to enable an out of office utility in connection with a first email account from a computer 117 or mobile device 201. The input may be user input received via respective input via one or more input devices of the computer 117 or mobile device 201, or an automated input generated by the operating system or application of the computer 117 or mobile device 201 in response to a determination that the user is out of office.

A determination that the user is out of office may be made using any one or more of various methodologies. In some embodiments, the location of a mobile device 201 associated with the first email account may be determined via triangulation based on location information from base stations 108 in the wireless network 101, or a GPS subsystem of the mobile device 201. When the mobile device 201 is greater than or equal to a predetermined distance from a predetermined office location (i.e. the device user's office or place of employment), the respective device user is determined to be out of office. The predetermined distance and predetermined office location may be configurable in some embodiments, and could be stored locally on the mobile device 201 or shared with the messaging server 132.

In other embodiments, calendar event data from a calendar application 276 could be used to determine that the user is out of office, for example, based on the calendar event data of scheduled events stored by the calendar application 276 and/or messaging server 132. As will be appreciated by persons skilled in the art, many calendar applications 276 have availability status fields which provide details such as the whether or not the user/calendar event is "out of office". For example, Microsoft Office™ and Microsoft Exchange™ messaging server 132 support to an availability status field which has four availability status options including "Free", "Tentative", "Busy", and "Out of Office". The availability status option for the availability status field of a calendar event object is typically selected by the device user, for example, from a "Show time as" drop-down box of a corresponding detailed calendar event user interface screen. Applications and device users accessing the device user's calendar data stored by the messaging server 132 are provided with the selected availability status option for the respective calendar event. Thus, the calendar application 276 and/or messaging server 132 could automatically generate an input to enable the out of office utility in connection with the device user's email account (i.e., the first email account) when a calendar event occurs in the device user's calendar with an availability status option of "Out of Office".

While examples of automatically enabling the out of office utility have been described in accordance with example embodiments for the purpose of illustration, the present disclosure is not limited to any particular method of user input or automated input for enabling the out of office utility. It will be appreciated that the present disclosure extends to any mechanism which automatically enables the out of office utility in response to a trigger condition and to any method of user input for enabling the out of office utility. Thus, in accordance with the present disclosure the out of office utility could be manually set by device users, automatically set, or both.

Next, in step 604 the messaging server 132 managing the first email account is notified by the computer 117 or mobile device 201 that the out of office utility has been enabled. This step is performed by the out of office module 280, or by the email client 272 when the out of office module 280 is part of the email client 272. When a mechanism for automatically setting the out of office utility is used, the messaging server 132 could determine whether the user is out of office based on calendar event information or location information, or the messaging server 132 could be provided with the determination whether the user is out of office from other sources. When the messaging server 132 determines whether the user is out of office in step 602 rather than the computer 117 or mobile device 201, the notifying step 604 may be omitted. When another source (e.g. location service) determines whether the user is out of office, the notification is provided by that other source rather than the computer 117 or mobile device 201.

Next, in step 606 an out of office presence status is provided in response to the enabling of the out of office utility. In some embodiments, providing the presence status comprises sending a presence status of "out of office" in a presence status data packet to one or more other recipients/ users who have the "out of office" device user associated with the first email account in their personal address book 274. This may comprise identifying one or more users having email accounts managed by the messaging server 132 which have a contact record matching the first email account. The presence status data packet is then sent to the identified user. Alternatively, email accounts could be identified rather than users. In some embodiments, identifying users or email accounts comprises analysing personal address books 274 associated with email accounts managed by the messaging server 132, and identifying one or more email accounts having a contact record which matches a user name or email address of the first email account. The analyzed personal address books 274 are typically stored by the messaging server 132 and may be, for example, a mirrored copy of the personal address books 274 stored on mobile device 201 and/or computer 117. The above steps could be performed by the wireless connector system 120 or messaging server 132, depending on the embodiment.

In other embodiments, providing the presence status comprises sending a presence status of "out of office" in a presence status data packet to the contacts of the "out of office" device user associated with the first email account have email accounts which are also managed by the messaging server 132. That is, enterprise contacts using the same messaging server 132. This may comprise identifying one or more contacts stored in the personal address book 274 associated with the first email account which are managed by the messaging server 132. The presence status data packet is then sent to the identified one or more email accounts. In such embodiments, identifying one or more contacts may comprises analysing the personal address book 274 associated with the first email account and identifying one or more email accounts in the personal address book 274 having a contact record which matches a user name or email address of an email account managed by the messaging server. The above steps could be performed by the wireless connector system 120 or messaging server 132.

In some embodiments, the messaging server 132 or wireless connector system 120 automatically pushes a presence status data packet to the contacts via the respective email addresses when the out of office utility is enabled. Where the email addresses of the contacts are associated with a mobile device 201, the presence status data packet is pushed wirelessly to the respective mobile devices 201 of the contacts via the wireless connector system 120. In some embodiments, the wireless connector system 120 could maintain information concerning the type of network with which mobile devices 201 are connected to the wireless network 101. In such embodiments, the presence status data packets could be pushed wirelessly to the respective mobile devices 201 when connected via a relatively inexpensive network type such as Wi-Fi™ but sent only in response to a trigger condition or request when not connected via a relatively inexpensive network type.

As noted above, the personal address book 274 is synchronized between the mobile device 201 and the messaging server 132. The determination of which contacts in the personal address book 274 are managed by the messaging server 132 may be made ahead of time and stored by the wireless connector system 120 or messaging server 132. For example, this determination may be made each time a contact record is added or modified. In such cases, the messaging server 132 can automatically push a presence status data packet to the predetermined contacts via the respective email addresses. It will be appreciated that the contacts in the personal address book 274 may be associated with mobile device 201, a computer 117 or both.

As noted above, in other embodiments the presence status data packet is determined and sent to the contacts from the messaging server 132 in response to one of a number of different trigger conditions rather than being pushed. The trigger conditions may be any of the trigger conditions mentioned above such as a request for the out of office presence status for a particular contact or user, selection input or lookup of the contact or user in a communication application such as the email client 272 on the mobile device 201 or computer 117, selection input or lookup of the contact or user in personal address book, input or lookup of the contact or user in the global address book 134, or input or lookup of the contact or user in another communication application configured to share presence information based on out of office presence status.

It will be appreciated that sending the presence status data packet "on demand" in response to a trigger condition and/or request rather than automatically pushing the presence status data packet may reduce data charges by limited the presence status data packets which are sent by the messaging server 132.

The messaging server 132 may also cancel or override the sending of out of office replies for recipients to whom the presence status data packets were sent. This may involve the messaging server 132 updating its records in respect of the out of office utility of the first email account to indicate that out of office replies are not to be sent to those recipients. Messaging servers 132 supporting the out of office utility typically only send out of office replies the first time that a message is received from a particular user after the out of office utility has been enabled. To support this functionality, messaging servers 132 typically maintain a list of email addresses/email accounts to which an out of office reply has been sent. When an email address/email account is on this list, no further out of office reply is sent to the email address/email account. The list is maintained until the out of office utility is disabled at which time the list is cleared. In a similar fashion, the messaging server 132 may store a list of recipients (e.g., email addresses/email accounts) to which the data packet was sent when the out of office utility is enabled for the first email account. The messaging server 132 will then sending out office replies when an email message address to the first email account is received only when the received email messages is not in the list of recipients. The list is maintained until the out of office utility is disabled for the first email account at which time the list is cleared.

In some embodiments, one or more predetermined presence rules are checked by the messaging server 132 before sending the presence status data packet. Depending on the predetermined presence rules, the presence status may only be provided when a predetermined presence rule associated with the first email account specifies that presence status is to be shared. The predetermined presence rule may also define the one or more recipients with which the presence status is shared, possible by user name and/or user group. The predetermined presence rule defining the one or more recipients with which the presence status is shared may be used instead of analysed personal address books of the "out of office" user or other users having email accounts managed by the messaging server 132 is, or could be applied as a filter on the results of that analyzed.

Next, in step 608 the presence status data packets sent by the messaging server 132 are then received by the contacts on respective mobile devices 201, computers 117, or both.

This step is performed by the out of office module 280, or by the email client 272 when the out of office module 280 is part of the email client 272. The presence status data packets are typically device level messages rather than messages meant for display. The presence status data packets typically occur and are processed at the transport layer of the device communication protocol stack and are not displayed on the display screen 204. However, presence status data packets could occur at a different layer in the device communication protocol stack in other embodiments.

Next, in step 610 the presence status of "out of office" contained in the presence status data packet is stored in the corresponding contact record in the personal address book 274 in a presence status field, or possibly in the office of office module 280. The presence status field may or may not be a displayable field depending on the embodiment.

Next, in step 612 a visual indication of "out of office" presence status displayed in a user interface screen providing a visual indication of presence status on the display screen 204 of the mobile device 201, or a display screen of a computer 117. In at least some embodiments, the user interface screen is configured for receiving input identifying one or more users via the user interface screen. The user interface screen may be a dialing screen 402 of phone application 278 in which dialling information for an outgoing call is input as shown in FIG. 4A-C, an email message composition user interface screen 502 in which information for an email message is input as shown in FIG. 5A-C, a user interface screen of the personal address book 274 such as a contact record user interface screen providing a detailed view of a contact record or a contact list user interface screen providing a list or summary view of multiple contact records of the personal address book 274, or any other user interface screens of the mobile device 201 or computer 117 which provides a visual indication of presence status for other users. The user interface screen is typically a communication application user interface screen.

The input identifying one or more users could be input received via a contact input field of the user interface screen, such as a field of the address portion 504 of the email message composition user interface screen 502, the dialing field 422 of the dialing screen 402, or a look field of a personal address book user interface screen (not shown). In response to receiving the input identifying one or more users Alternatively, the input identifying one or more users could be selection input selecting one of the contact records displayed in a menu of contact entries in a personal address book user interface screen (not shown) to display a detailed view of that contact record. In response to the received input, the visual indication of presence status is displayed in the user interface screen for one or more users matching the input in accordance with the stored presence status.

In some embodiments in which the input identifying one or more users is input received via a contact input field, the method includes the steps (not show) of determining the one or more users which match the received input, and displaying a list of the one or more users which match the received input in the user interface screen. The visual indication of presence status is displayed in the list of the user interface screen in association with the respective users. In some embodiments, the visual indication is displayed only when the stored presence status is "out of office".

If the user interface screen which provides a visual indication of presence status is not displayed on the display screen of the computer 117 or mobile device 201 when the presence update data packet is received, then the out of office presence status will be displayed when the corresponding user interface screen is next displayed. This may occur in embodiments in which presence status is pushed in that, when the pushed presence update data packet is received, the currently displayed user interface screen may not provide a visual indication of presence status. In contrast, trigger conditions which request presence status are typically generated in the context of user interface screens which do provide a visual indication of presence status.

The "out of office" presence status may be indicated by the background colour of a respective field in the user interface screen, the colour of the text within the respective field, a corresponding icon, a text label, or any combination of these. The indication of "out of office" presence status is not intended to be limited to any particular user interface scheme.

Next, in step 614 the email client 272 receives input to disable the out of office utility in connection with the first email account from a computer 117 or mobile device 201. The input may be user input received via respective input via one or more input devices of the computer 117 or mobile device 201, or an automated input generated by the operating system or application of the computer 117 or mobile device 201 in response to a determination that the user is "in the office".

A determination that the user is "in the office" may be made using any one or more of various methodologies. In some embodiments, the location of a mobile device 201 associated with the first email account may be determined via triangulation based on location information from base stations 108 in the wireless network 101, or a GPS subsystem of the mobile device 201. When the mobile device 201 is less than a predetermined distance from the predetermined office location, the respective device user is determined to be "in the office". The predetermined distance and predetermined office location may be configurable in some embodiments, and could be stored locally on the mobile device 201 or shared with the messaging server 132.

In other embodiments, calendar event data from a calendar application 276 could be used to determine that the user is in the office, for example, based on the calendar event data of scheduled events stored by the calendar application 276 and/or messaging server 132. Thus, the calendar application 276 and/or messaging server 132 could automatically generate an input to disable the out of office utility in connection with the device user's email account (i.e., the first email account) when a calendar event occurs in the device user's calendar with an availability status option other than "Out of Office".

Next, in step 616 the messaging server 132 managing the first email account is notified by the computer 117 or mobile device 201 that the out of office utility has been disabled. This step is performed by the out of office module 280, or by the email client 272 when the out of office module 280 is part of the email client 272.

Next, in step 618 an out of office presence status is provided in response to the enabling of the out of office utility. In some embodiments, providing the presence status comprises sending a presence status of "in the office" in a presence status data packet to one or more contacts of the device user who have email accounts managed by the messaging server 132. In some embodiments, the messaging server 132 automatically pushes a presence status data packet to the contacts via the respective email addresses when the out of office utility is disabled. Where the email addresses of the contacts are associated with a mobile device 201, the presence status data packet is pushed wirelessly to the respective mobile devices 201 of the contacts. In other embodiments, the presence status data packet is determined and sent to the contacts from the messaging server 132 in response to one of a number of different trigger conditions rather than being pushed.

Next, in step 620 the presence status data packets sent by the messaging server 132 are then received by the contacts on respective mobile devices 201, computers 117, or both. This step is performed by the out of office module 280, or by the email client 272 when the out of office module 280 is part of the email client 272.

Next, in step 622 the presence status of "in the office" contained in the presence status data packet is stored in the corresponding contact record in the personal address book 274 in a presence status field, or possibly in the office of office module 280. In some embodiments, a default presence status of "in the office" is used as this tends to be the normal circumstance. In such embodiments, the presence status field could be empty when the presence status is "in the office". Using a default presence status which assumes a device user is "in the office" unless otherwise provided reduces stored information and onscreen notifications, saving memory and processing resources. This also avoids cluttering or otherwise complicating user interface screens by providing onscreen notifications only when contacts are "out of office".

Next, in step 624 a visual indication of "in the office" presence status is displayed in a user interface screen providing a visual indication of presence status. In accordance with the default presence status which assumes a device user is "in the office", in some embodiments no affirmative visual indication is provided when a user is "in the office. The user's presence status of "in the office" can be determined by a device user by a lack of any affirmative visual indication. That is, the default text and background are used to display the contact name and/or other information. If the user interface screen which provides a visual indication of presence status is displayed on the display screen when the presence update data packet is received, then the user interface screen will need to be redisplayed with the new out of office presence status of "in the office". If the user interface screen which provides the visual indication of presence status is not displayed on the display screen of the computer 117 or mobile device 201 when the presence update data packet is received, then the presence status will be displayed when the corresponding user interface screen is next displayed. In other embodiments, an affirmative visual indication could be provided when a user is "in the office" to provide affirmative presence status.

The present disclosure uses the out of office utility, a common feature of email clients, as the basis for presence status determination and delivery. This is advantageous in several respects. Firstly, because the out of office utility is a feature commonly used by users, it may be easier for users to adapt existing email behaviours to use the out of office utility for sharing presence status. Thus, out of office presence status enhances existing email messaging behaviours of device users rather than requiring users to change their habits or learn new habits in order to take advantage of the method of sharing presence provided by the present disclosure. This may increase adoption rates of using out of office presence status. Secondly, messaging servers and email clients 272 only require minor additions and modifications to support out of office presence status. Lastly, out of office presence status may be sharing with other messaging applications via the messaging server 132 and/or the personal address book of a computer or mobile device. For example, out of office presence status may be provided in the message composition environment, address book, telephone application, or other communication application. When out of office presence status may be provided in the message composition environment in advance of a user sending a message so that the user can choose an alternative means for contacting the user who is "out of office". For example, a user who was composing a message to a first email address may then use an alternate email address, initiate a telephone call, send an IM message or text message, or select another means of communication to reach the out of office user. Moreover, if out of office presence status is provided in advance of sending a message, the sending of traditional out of office replies could be eliminated if desired.

While the operations 600 have been described as occurring in a particular order, it will be appreciated to persons skilled in the art that some of the steps may be performed in a different order provided that the result of the changed order of any given step will not prevent or impair the occurrence of subsequent steps. Furthermore, some of the steps described above may be combined in other embodiments, and some of the steps described above may be separated into a number of sub-steps in other embodiments. In addition, while the operations 600 have been described as being performed by computing devices (e.g., computers 117 and mobile devices 201) having email accounts managed by a common messaging server 132 within the network 124, the described functionality could be extended to "external" computing devices outside of the network 124 with the assistance of a proxy server for managing the out of office presence information between network computing devices and external computing devices.

While the present disclosure is primarily described in terms of a method of sharing presence information performed by electronic devices and a messaging server, the teachings of the present disclosure also extend to methods performed by an electronic device which has its out of office utility enabled/disabled and notifies the messaging server, to methods performed by the messaging server or a wireless connector system in response to receiving the notification that the out of office utility enabled/disabled and in generating presence status data packets, to methods performed by an electronic device which receives and processes presence status data packets from the messaging server or wireless connector system and uses the presence status, and to suitably configured electronic devices, messaging servers and wireless connector systems.

While the present disclosure is primarily described in terms of methods, a person of ordinary skill in the art will understand that the present disclosure is also directed to various apparatus including components for performing at least some of the aspects and features of the described methods, be it by way of hardware components, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A method performed by a mobile communication device, the method comprising:
   displaying a message composition user interface by an application executing on the mobile communication device;
   responsive to determining that a partial input received via the message composition user interface matches two or more entries in an address book, automatically displaying a name and a presence indication for each of the two or more entries matching the partial input based on a trigger condition, wherein the presence indication is based on a color associated with the name, wherein the partial input comprises less than all the characters of names of the two or more entries that are being displayed, and wherein the trigger condition is a location of the mobile communication device;
   receiving a selection of one of the names of the two or more entries that are being displayed via the message composition user interface; and
   sending a message to a contact associated with the selected name, wherein when the presence indication indicates that a person corresponding to the contact is in an out of office state, the presence indication enables a user of the mobile communication device to select one or more alternative means for sending the message to the contact.

2. The method of claim 1, wherein the partial input is displayed in one of a "To" field or a "CC" field of the message composition user interface.

3. The method of claim 1, wherein the application is an electronic messaging application comprising a common lookup module providing centralized lookup capabilities for contact information for different applications on the mobile communication device.

4. The method of claim 1, wherein the color associated with each of the names of the two or more entries that are being displayed is at least one of a text color or a background color of a respective name.

5. The method of claim 1, wherein the message is received via the message composition user interface.

6. The method of claim 1, wherein the message is one of a text message, short message service (SMS) message, multimedia messaging service (MMS) message, email message, or chat application message.

7. The method of claim 1, wherein the color of the presence indication indicates whether a user associated with each of the names of the two or more entries that are being displayed via the message composition user interface is out of office or in the office.

8. The method of claim 1, wherein the color of the presence indication indicates whether a user associated with each of the names of the two or more entries that are being displayed via the message composition user interface is available or unavailable.

9. The method of claim 1, wherein the color of the presence indication indicates whether a user associated with each of the names of the two or more entries that are being displayed via the message composition user interface is present or not present.

10. The method of claim 1, wherein the color of the presence indication indicates whether a user associated with each of the names of the two or more entries that are being displayed via the message composition user interface is able to communicate or unable to communicate.

11. A mobile communication device comprising a memory device and a processor configured to execute instructions stored on the memory device such that when executed, cause the mobile communication device to:
   display a message composition user interface by an application executing on the mobile communication device;
   receive a partial input via the message composition user interface;
   responsive to a determination that the partial input matches two or more entries in an address book, automatically display a name and a presence indication for each of the two or more entries matching the partial input based on a trigger condition, wherein the presence indication is based on a color associated with the name, wherein the partial input comprises less than all the characters of names of the two or more entries that are being displayed, and wherein the trigger condition is a location of the mobile communication device;
   receive a selection of one of the names of the two or more entries that are being displayed; and
   send a message to a contact associated with the selected name, wherein when the presence indication indicates that a person corresponding to the contact is in an out of office state, the presence indication enables a user of the mobile communication device to select one or more alternative means for sending the message to the contact.

12. The mobile communication device of claim 11, wherein the partial input is displayed in one of a "To" field or a "CC" field of the message composition user interface.

13. The mobile communication device of claim 11, wherein the application is an electronic messaging application comprising a common lookup module providing centralized lookup capabilities for contact information for different applications on the mobile communication device.

14. The mobile communication device of claim 11, wherein the color associated with each of the names of the two or more entries that are being displayed is at least one of a text color or a background color of a respective name.

15. The mobile communication device of claim 11, wherein the message is received via the message composition user interface.

16. The mobile communication device of claim 11, wherein the message is one of a text message, short message service (SMS) message, multimedia messaging service (MMS) message, email message, or chat application message.

17. The mobile communication device of claim 11, wherein the color of the presence indication indicates whether a user associated with each of the names of the two or more entries that are being displayed via the message composition user interface is out of office or in the office.

18. The mobile communication device of claim 11, wherein the color of the presence indication indicates whether a user associated with each of the names of the two or more entries that are being displayed via the message composition user interface is available or unavailable.

19. The mobile communication device of claim 11, wherein the color of the presence indication indicates whether a user associated with each of the names of the two or more entries that are being displayed via the message composition user interface is present or not present.

20. The mobile communication device of claim 11, wherein the color of the presence indication indicates whether a user associated with each of the names of the two or more entries that are being displayed via the message composition user interface is able to communicate or unable to communicate.

21. A non-transitory computer readable medium storing computer instructions executable by a processor to implement a method, the method comprising:
   displaying a message composition user interface by an application executing on a mobile communication device;
   responsive to determining that a partial input received via the message composition user interface matches two or more entries in an address book, automatically displaying a name and a presence indication for each of the two or more entries matching the partial input based on a trigger condition, wherein the presence indication is based on a color associated with the name, wherein the partial input comprises less than all the characters of the names of the two or more entries that are being displayed, and wherein the trigger condition is a location of the mobile communication device;
   receiving a selection of one of the names of the two or more entries that are being displayed via the message composition user interface; and
   sending a message to a contact associated with the selected name, wherein when the presence indication indicates that a person corresponding to the contact is in an out of office state, the presence indication enables a user of the mobile communication device to select one or more alternative means for sending the message to the contact.

22. The non-transitory computer readable medium of claim 21, wherein the partial input is displayed in one of a "To" field or a "CC" field of the message composition user interface.

23. The non-transitory computer readable medium of claim 21, wherein the application is an electronic messaging application comprising a common lookup module providing centralized lookup capabilities for contact information for different applications on the mobile communication device.

24. The non-transitory computer readable medium of claim 21, wherein the color associated with each of the names of the two or more entries that are being displayed is at least one of a text color or a background color of a respective name.

25. The non-transitory computer readable medium of claim 21, wherein the message is received via the message composition user interface.

26. The non-transitory computer readable medium of claim 21, wherein the message is one of a text message, short message service (SMS) message, multimedia messaging service (MMS) message, email message, or chat application message.

27. The non-transitory computer readable medium of claim 21, wherein the color of the presence indication indicates whether a user associated with each of the names of the two or more entries that are being displayed via the message composition user interface is out of office or in the office.

28. The non-transitory computer readable medium of claim 21, wherein the color of the presence indication indicates whether a user associated with each of the names of the two or more entries that are being displayed via the message composition user interface is available or unavailable.

29. The non-transitory computer readable medium of claim 21, wherein the color of the presence indication indicates whether a user associated with each of the names of the two or more entries that are being displayed via the message composition user interface is present or not present.

30. The non-transitory computer readable medium of claim 21, wherein the color of the presence indication indicates whether a user associated with each of the names of the two or more entries that are being displayed via the message composition user interface is able to communicate or unable to communicate.

* * * * *